(12) United States Patent
Park et al.

(10) Patent No.: US 12,167,466 B2
(45) Date of Patent: Dec. 10, 2024

(54) METHOD AND APPARATUS FOR RANDOM ACCESS USING PRACH IN MULTI-DIMENSIONAL STRUCTURE IN WIRELESS COMMUNICATION SYSTEM

(71) Applicant: Samsung Electronics Co., Ltd., Suwon-si (KR)

(72) Inventors: Sunho Park, Suwon-si (KR); Youngjoon Kim, Suwon-si (KR); Kitaek Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 17/843,287

(22) Filed: Jun. 17, 2022

(65) Prior Publication Data

US 2022/0418003 A1 Dec. 29, 2022

(30) Foreign Application Priority Data

Jun. 28, 2021 (KR) .................. 10-2021-0084293

(51) Int. Cl.
*H04W 74/0833* (2024.01)
*H04L 43/0864* (2022.01)

(52) U.S. Cl.
CPC ..... *H04W 74/0833* (2013.01); *H04L 43/0864* (2013.01)

(58) Field of Classification Search
CPC ......... H04W 74/0833; H04W 74/0866; H04W 56/004; H04W 74/006; H04W 56/009;
(Continued)

(56) References Cited

U.S. PATENT DOCUMENTS 9,380,605 B1* 6/2016 Lee .................. H04W 72/54
2014/0044108 A1 2/2014 Earnshaw et al.
(Continued)

FOREIGN PATENT DOCUMENTS

KR 10-2018-0122561 A 11/2018
KR 10-2020-0040193 A 4/2020
(Continued)

OTHER PUBLICATIONS

Samsung; Discussion on phase noise modeling; 3GPP TSG RAN WG1 Meeting #85; R1-163984; May 23-27, 2016; Nanjing, China.
(Continued)

*Primary Examiner* — Tejis Daya
(74) *Attorney, Agent, or Firm* — Jefferson IP Law, LLP

(57) ABSTRACT

The disclosure relates to a 5th generation (5G) or 6th generation (6G) communication system for supporting a data transmission rate higher than a 4th generation (4G) communication system such as long term evolution (LTE). A user equipment (UE) in a communication system is provided. The UE includes a transceiver, and a controller configured to receive, from a base station, system information including information related to transmission of a random access preamble, and to transmit, to the base station, a physical random access channel (PRACH) including the random access preamble. The PRACH includes at least one primary signal part including a first sequence for measuring a first delay within a symbol, and at least one secondary signal part including a second sequence for measuring a second delay in units of symbols, and a round trip delay (RTD) between the UE and the base station may be determined based on the first delay within the symbol and the second delay in units of symbols.

20 Claims, 21 Drawing Sheets

(58) Field of Classification Search
CPC .............. H04W 74/004; H04W 74/008; H04L 43/0864
See application file for complete search history.

(56) References Cited

U.S. PATENT DOCUMENTS

| | | |
|---|---|---|
| 2017/0238298 A1 | 8/2017 | Wang et al. |
| 2018/0310341 A1 | 10/2018 | Yerramalli et al. |
| 2019/0098589 A1 | 3/2019 | Chae et al. |
| 2019/0150190 A1 | 5/2019 | Kim et al. |
| 2019/0281564 A1 | 9/2019 | Yang et al. |
| 2020/0053786 A1 | 2/2020 | Kim et al. |
| 2021/0006328 A1 | 1/2021 | Kim |
| 2022/0007455 A1 | 1/2022 | Hong |
| 2023/0156803 A1* | 5/2023 | Zhang .................. H04W 72/23 370/329 |

FOREIGN PATENT DOCUMENTS

| | | |
|---|---|---|
| WO | WO-2018084879 A1 * | 5/2018 |
| WO | 2019/019101 A1 | 1/2019 |
| WO | 2021/058186 A1 | 4/2021 |

OTHER PUBLICATIONS

International Search Report with Written Opinion dated Sep. 23, 2022; International Appln. No. PCT/KR2022/008650.
European Search Report dated Aug. 14, 2024, issued in European Application No. 22833476.9.

* cited by examiner

METHOD AND APPARATUS FOR RANDOM ACCESS USING PRACH IN MULTI-DIMENSIONAL STRUCTURE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0084293, filed on Jun. 28, 2021, in the Korean Intellectual Property Office, the disclosure of which is incorporated by reference herein in its entirety.

BACKGROUND

1. Field

The disclosure relates to a random access channel structure in a wireless communication system, an operation method, and an apparatus therefor.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the ¹/₁₀ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in millimeter wave (mmWave) bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than orthogonal frequency-division multiplexing (OFDM), beamforming and massive multiple-input multiple-output (MIMO), full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (user equipment (UE) transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive extended reality (XR), high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

Terahertz band communication that is being considered for a 6G communication system is a communication system that generally uses electromagnetic waves in the range of approximately 100 GHz to 10 THz. In the terahertz band, a frequency bandwidth of tens of GHz may be utilized, and ultrawide-band high-speed communication may be performed using the same. In a communication system that utilizes the ultrawide-band of a terahertz band, a symbol section may be decreased to a level of hundreds ns due to physical constraints. Accordingly, numerology that has been used in 5G of the related art may need to be extended.

In the case of a physical random access channel (PRACH) for uplink synchronization, the PRACH structure of the related art has a measurable round trip delay (RTD) that is limited to 1 symbol section. The maximum RTD in a base station cell is determined based on a physical distance, and thus, in THz band communication where a symbol length is decreased more than that of the new radio (NR) when numerology is extended, an RTD may happen to exceed 1 symbol section. Although a UE located in the distance performs random access to a base station using the PRACH structure of the related art, the base station is incapable of accurately estimating an RTD value. Accordingly, a timing advance value may not be accurately calculated and random access by the UE may be unavailable, which is drawback. To address the drawback, a new PRACH structure may be needed in a B5G or 6G communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide the structure of a random access channel having a structure extended in multiple dimensions, an operation method, and an apparatus therefor in an orthogonal frequency division multiple access-based wireless communication system.

Additional aspects will be set forth in part in the description which follows and, in part, will be apparent from the description, or may be learned by practice of the presented embodiments.

In accordance with an aspect of the disclosure, a user equipment (UE) in a communication system is provided. The UE may include a transceiver and a controller, and the controller may be configured to receive, from a base station, system information including information related to transmission of a random access preamble, and to transmit, to the base station, a physical random access channel (PRACH) including the random access preamble. The PRACH may include at least one primary signal part including a first sequence for measuring a first delay within a symbol, and at least one secondary signal part including a second sequence for measuring a second delay in units of symbols, and a round trip delay (RTD) between the UE and the base station may be determined based on the first delay within the symbol and the second delay in units of symbols.

According to an embodiment, the first delay within the symbol may be determined based on the first sequence of the at least one primary signal part received in a primary window.

According to an embodiment, the primary window may be defined based on the maximum RTD of a cell and the length of a section including the first sequence included in the at least one primary signal part.

According to an embodiment, the second delay in units of symbols may be determined based on the second sequence of the at least one secondary signal part received in a secondary window.

According to an embodiment, the secondary window is defined based on a primary window, the first delay within the symbol determined based on the primary window, and the length of a section including the second sequence included in the at least one secondary signal part.

According to an embodiment, each of the at least one secondary signal part may include the second sequence repeated a different number of times, and the second delay in units of symbols may be determined based on whether the second sequence of each of the at least one secondary signal part is received in a secondary window.

According to an embodiment, each of the at least one secondary signal part may include a plurality of different second sequences, and the second delay in units of symbols may be determined based on the combination of second sequences received respectively from the at least one secondary signal part in a secondary window.

According to an embodiment, the PRACH may include a plurality of primary signal parts, and the first delay within the symbol may be determined based on the combination of sequences of the plurality of primary signal parts received in a primary window.

In accordance with another aspect of the disclosure, a base station of a communication system is provided. The base station may include a transceiver and a controller, and the controller may be configured to transmit system information including information related to transmission of a random access preamble, and to receive, from a UE, a PRACH including the random access preamble. The PRACH may include at least one primary signal part including a first sequence for measuring a first delay within a symbol and at least one secondary signal part including a second sequence for measuring a second delay in units of symbols, and a RTD between the UE and the base station may be determined based on the first delay within the symbol and the second delay in units of symbols.

In accordance with another aspect of the disclosure, a method of a UE in a communication system is provided. The method includes an operation of receiving, from a base station, system information including information related to transmission of a random access preamble, and an operation of transmitting, to the base station, a PRACH including the random access preamble. The PRACH may include at least one primary signal part including a first sequence for measuring a first delay within a symbol and at least one secondary signal part including a second sequence for measuring a second delay in units of symbols, and a RTD between the UE and the base station may be determined based on the first delay within the symbol and the second delay in units of symbols.

In accordance with another aspect of the disclosure, a method of a base station in a communication system is provided. The method includes an operation of transmitting, to a UE, system information including information related to transmission of a random access preamble, and an operation of receiving, from the UE, a PRACH including the random access preamble. The PRACH may include at least one primary signal part including a first sequence for measuring a first delay within a symbol and at least one secondary signal part including a second sequence for measuring a second delay in units of symbols, and a RTD between the UE and the base station may be determined based on the first delay within the symbol and the second delay in units of symbols.

According to various embodiments of the disclosure, an improved physical random access structure, a random access method, and an apparatus therefor in a wireless communication system are provided. In addition, according to various embodiments of the disclosure, a random access method and apparatus of a UE disposed in a location at which the UE has a round trip delay longer than 1 symbol section in a wireless communication system are provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
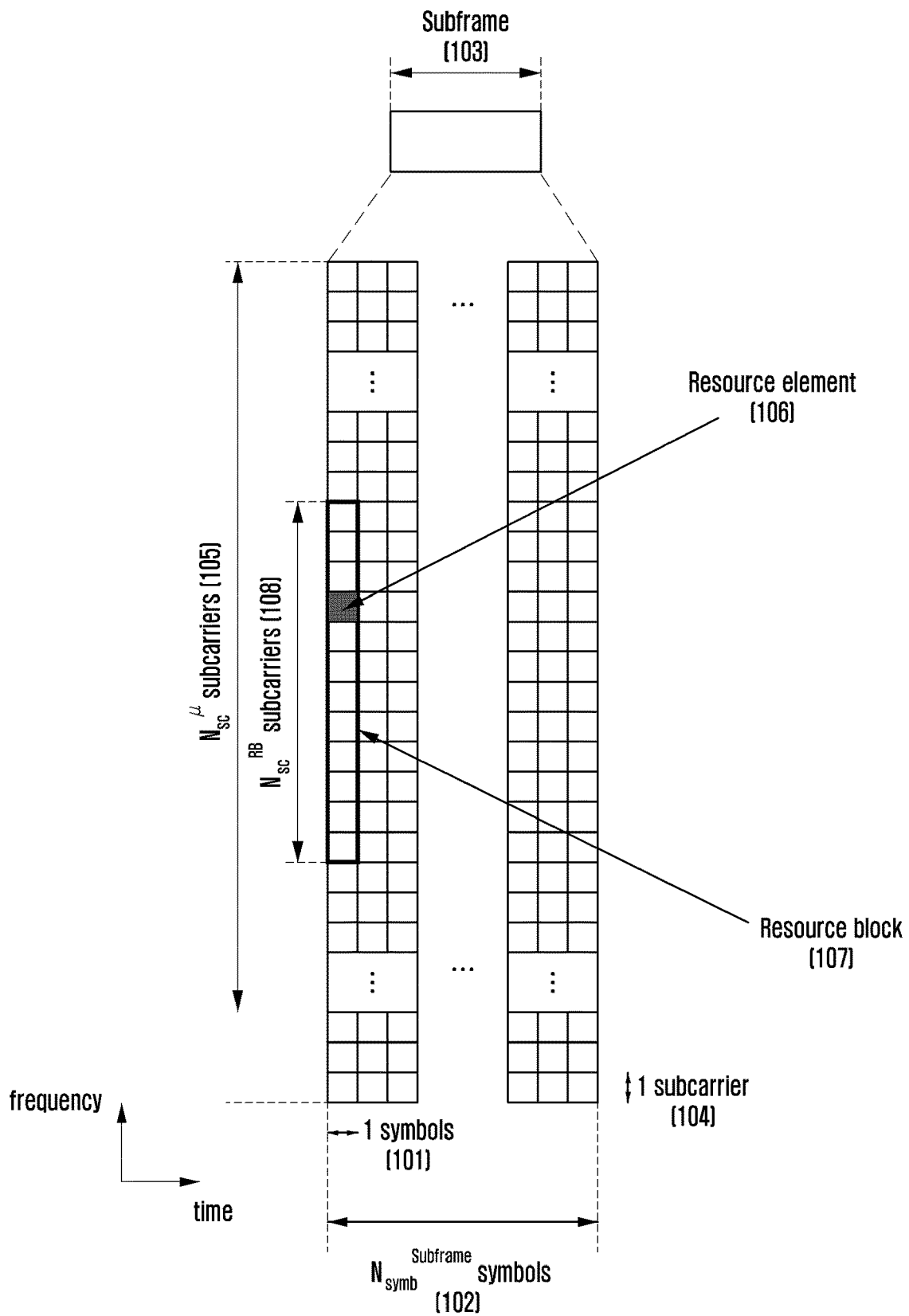
FIG. 1 is a diagram illustrating the basic structure of the time-frequency domain that is a radio resource area of a 5th generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of 3rd generation partnership project (3GPP), long-term evolution (LTE) or evolved universal terrestrial radio access (E-UTRA), LTE-Advanced (LTE-A), LTE-Pro, high-rate packet data (HRPD) of 3GPP2, ultra-mobile broadband (UMB), Institute of Electrical and Electronics Engineers (IEEE) 802.16e, and the like, as well as typical voice-based services.

Since 5th-generation (5G) communication systems, which are communication systems beyond LTE, must have ability to freely reflect various requirements of users, service providers, and the like, they are evolving to support services satisfying various requirements. The services considered in the 5G communication systems include enhanced mobile broadband (eMBB) communication, massive machine-type communication (mMTC), ultra-reliability low-latency communication (URLLC), and the like. Therefore, connected devices that have been exponentially increasing after commercialization of the 5G communication systems will be connected to communication networks. Examples of things connected to networks may include vehicles, robots, drones, home appliances, displays, smart sensors installed in various infrastructures, construction machines, factory equipment, and the like. Mobiles devices are expected to evolve into various formfactors such as augmented reality glasses, virtual reality headsets, and hologram devices.

In order to provide various services by connecting hundreds of billions of devices and things in the 6G era of post-5G systems, there have been ongoing efforts to develop improved 6G communication systems. For these reasons, 6G communication systems are referred to as beyond-5G systems. 6G communication systems, which are expected to be implemented approximately by 2030, will have a maximum transmission rate of tera (1,000 giga)-level bps and a radio latency of 100 μsec, and thus will be 50 times as fast as 5G communication systems and have the ¹/₁₀ radio latency thereof. In order to accomplish such a high data transmission rate and an ultra-low latency, it has been considered to implement 6G communication systems in terahertz bands.

Terahertz band communication is a communication system that generally uses electromagnetic waves in the range of approximately 100 GHz to 10 THz. In the terahertz band, a frequency bandwidth of tens of GHz may be utilized and ultrawide-band high-speed communication may be available. In a communication system that utilizes the ultrawide-band of a terahertz band, a symbol section may be decreased to a level of hundreds ns due to physical constraints. Accordingly, numerology that has been used in 5G of the related art may need to be extended.

In the case in which new numerology is applied, whether a physical random access channel (PRACH) that performs uplink synchronization operates needs to be considered. In the case of the PRACH structure of the related art, a measurable round trip delay is limited to 1 symbol section. In the THz band communication where a symbol length is decreased when compared to that of NR, the maximum round trip delay between a base station and a user equipment (UE) in a base station cell is determined based on a physical distance and thus, a round trip delay may happen to exceed 1 symbol section. Although a UE located in the distance performs random access to a base station using the PRACH structure of the related art, the base station is incapable of accurately estimating a round trip delay value. Accordingly, a timing advance value may not be accurately calculated and random access by the UE may be unavailable, which is drawback.

To address the problem, a new PRACH structure is required in the B5G or 6G communication system. However, a new PRACH structure has not been proposed.

Before proposing the disclosure, the frame structure of a 5G system will be described in detail with reference to drawings. Although the following resource structure is illustrated as the resource structure of the 5G system for ease of description, the disclosure is not limited to the 5G system, and may be applied to other communication systems having structures similar thereto.

FIG. 1 is a diagram illustrating the basic structure of the time-frequency domain that is a radio resource area of the 5G system according to an embodiment of the disclosure.

Referring to FIG. 1, the horizontal axis is the time domain and the vertical axis is the frequency domain. The minimum transport unit in the time domain is an OFDM symbol 101 (symbol), and $N_{symb}^{Subframe}$ OFDM symbols 102 may be included in a single subframe 103. The minimum transport unit in the frequency domain is a subcarrier 104, and the bandwidth of a transmission band may include a total of $N_{sc}^{\mu}$ subcarriers 105. A basic resource unit in the time-frequency domain is a resource element (RE) 106, and an RE is expressed by an OFDM symbol index and a subcarrier index. A resource block (RB) 107 or a physical resource block (PRB) may be defined as $N_{sc}^{RB}$ consecutive subcarriers 108 in the frequency domain.

In the process of performing initial access to a base station that operates a radio resource area according to the described structure, the UE may complete synchronization with the base station using a primary synchronization signal (PSS) and a secondary synchronization signal (SSS) transmitted from the base station. The UE that completes synchronization with the base station receives a master information block (MIB) and a system information block (SIB) transmitted from the base station, and may obtain information needed for performing communication with the base station in the future. The base station is not aware of the existence of the UE until this step, and thus the UE performs a random access procedure with respect to the base station and performs access to the base station.

Figure 2:
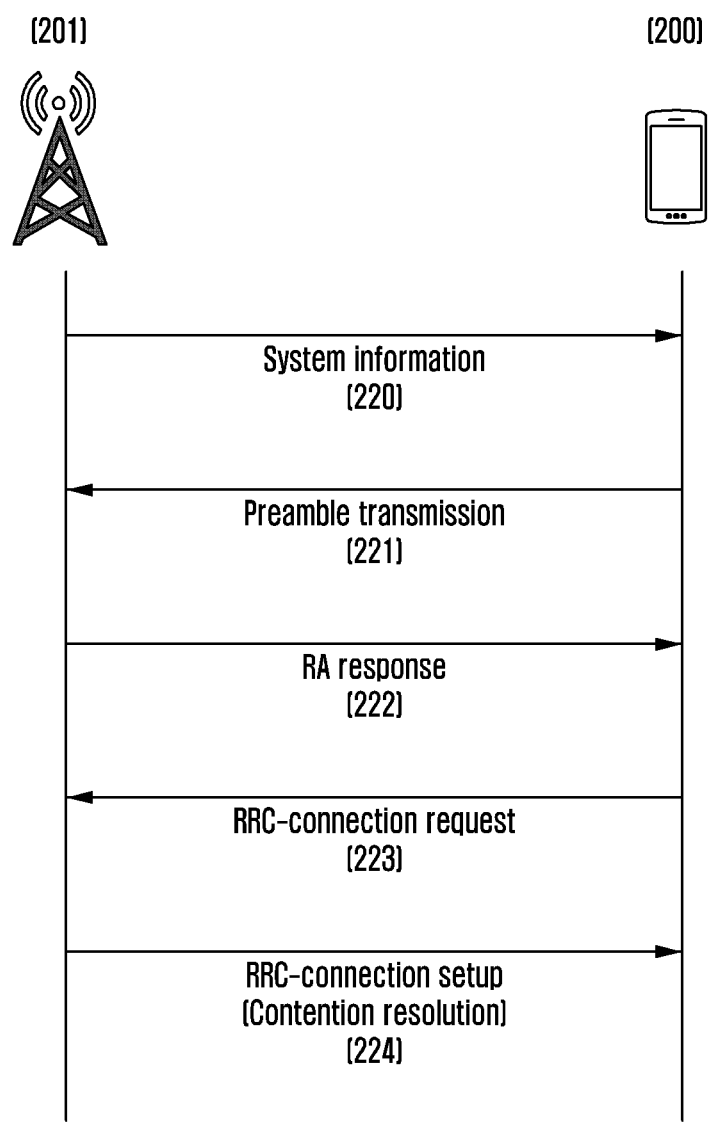
FIG. 2 is a flowchart illustrating a random access process in the 5G system according to an embodiment of the disclosure.

FIG. 2 is a flowchart illustrating a random access process in the 5G system according to an embodiment of the disclosure.

Referring to FIG. 2, a UE 200 may perform a random access operation in order to communicate with the base station 201. In FIG. 2, the UE 200 that performs an initial access process may receive, from the base station 201, system information needed for initial access. The UE 200 may receive the system information via a broadcast channel that the base station 201 transmits in a cell in common. The UE 200 that performs the initial access process may receive system information, and the system information may include at least one among the following information.

random access resource area configuration information
random access preamble information
random access response window size
random access preamble transmission power information
maximum number of times that a random access preamble is transmitted The random access resource area configuration information may include a parameter indicating a time and frequency resource area used for the UE 200 to transmit a random access preamble to the base station 201.

The random access preamble information may include a parameter for configuring the sequence of a random access preamble used by the base station 201. In the 5G system, 64 sequences needed for random access preamble transmission may be configured by performing cyclic shift on a Zadoff-Chu sequence having a sample length in the range of 139 to 839, or by using different root values. The UE 200 may use one of the 64 sequences based on the random access preamble information and may transmit a random access preamble to the base station 201.

The random access response (RAR) window size information may be a time interval in which the UE 200 that transmits a random access preamble is capable of receiving an RAR corresponding to the random access preamble from the base station 201. In the case in which the UE 200 fails to receive an RAR within the RAR window, the UE 200 may regard that the base station 201 fails to detect a random access preamble and may retransmit a new random access preamble.

The random access preamble transmission power information may include a parameter for determining transmission power for initial random access preamble transmission and retransmission to be performed by the UE 200.

The maximum number of times that a random access preamble is transmitted is the maximum number of times that the UE 20 is capable of transmitting a random access preamble.

The UE 200 may transmit a random access preamble to the base station 201 according to the received system information in operation 221. The base station 201 may attempt detection of a random access preamble that UEs in a cell transmit in a random access preamble transmission resource area, and may transmit an RAR signal to the corresponding UE in response to the detected random access preamble in operation 222. In the case in which the base station 201 detects a random access preamble of a predetermined UE, the base station 201 may transmit an RAR associated with the detected random access preamble within the RAR window. The RAR signal transmitted by the base station 201 may include various types of control information (e.g., uplink resource allocation information) related to a signal that the UE 200 is to transmit to the base station 201 in a subsequent operation (in operation 223).

In the case in which the UE 200 that transmits the random access preamble in operation 221 receives the RAR signal from the base station 201 in operation 222, the UE 200 assumes that the base station 201 detects the random access preamble, and may transmit, to the base station 201, information needed for initial access to the base station via a layer 2 or layer 3 (L2/L3) message (i.e., msg3) in a higher layer in operation 223.

In the case in which the base station 201 normally receives the L2/L3 message in operation 223, the base station 201 may transmit, to the UE 200, a contention resolution message indicating that the base station 201 has received the L2/L3 message of the UE 200 without confliction with L2/L3 messages of other UEs in operation 224. Via operations 220 to 224, the initial access process by the UE 200 may be completed.

Figure 3:
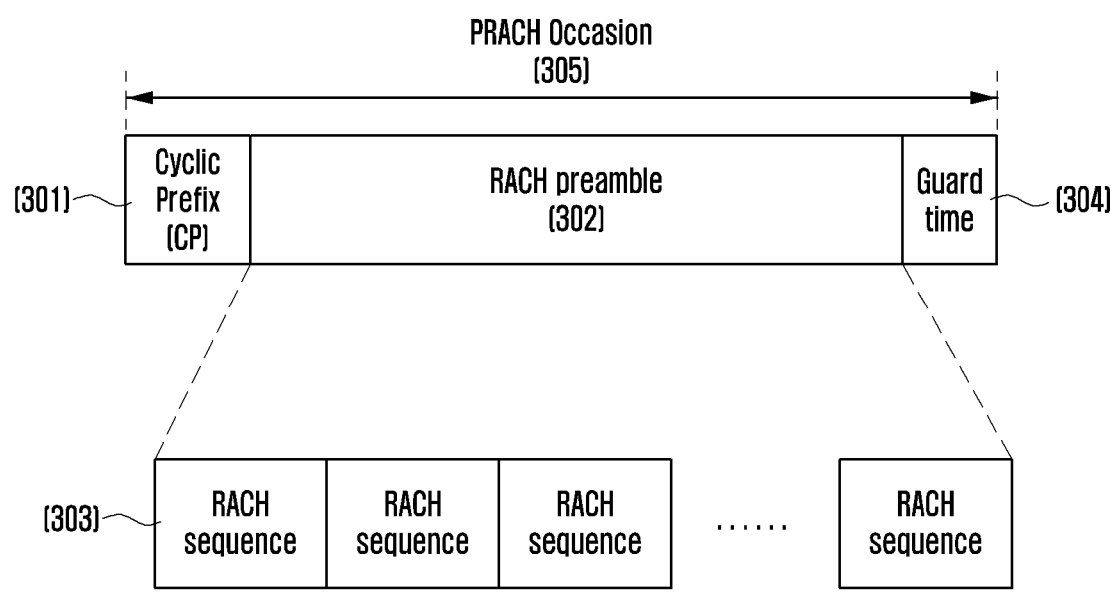
FIG. 3 is a diagram illustrating the structure of a physical random access channel (PRACH) preamble of the 5G system according to an embodiment of the disclosure.

FIG. 3 is a diagram illustrating the structure of a PRACH occasion of the 5G system according to an embodiment of the disclosure.

Referring to FIG. 3, a single PRACH occasion 305 is configured to include one or more elements among a cyclic prefix (CP) 301, a random access channel (RACH) preamble 302, and a guard time 304. The length of the CP 301 may be designed to accept a change in the round trip delay and propagation delay of all UEs within the radius of a cell. The RACH preamble 302 may include one or more RACH sequences 303, and may be configured to have a structure in which the same sequence is repeated in the case in which a plurality of RACH sequences are included. The signal of each RACH sequence may include a sequence that satisfies a predetermined condition. Although, in the case of the 5G system, for example, a Zadoff-Chu sequence is used, the disclosure does not limit, to the Zadoff-Chu sequence, a sequence to be used. Each RACH sequence may be transmitted in a predetermined time interval. For example, each RACH sequence may be transmitted via s single symbol, which does not limit the range of the disclosure. Hereinafter, unless otherwise defined, the length of a RACH sequence may be the length of a time interval in which a RACH sequence is transmitted. The length of the guard time 304 may be determined by a multi-path delay of a cell, a PRACH format, and the like. In the disclosure, illustrating a guard time will be omitted in subsequent drawings. Although a guard time is not illustrated, a guard time may be present when a system requires.

Figure 4:
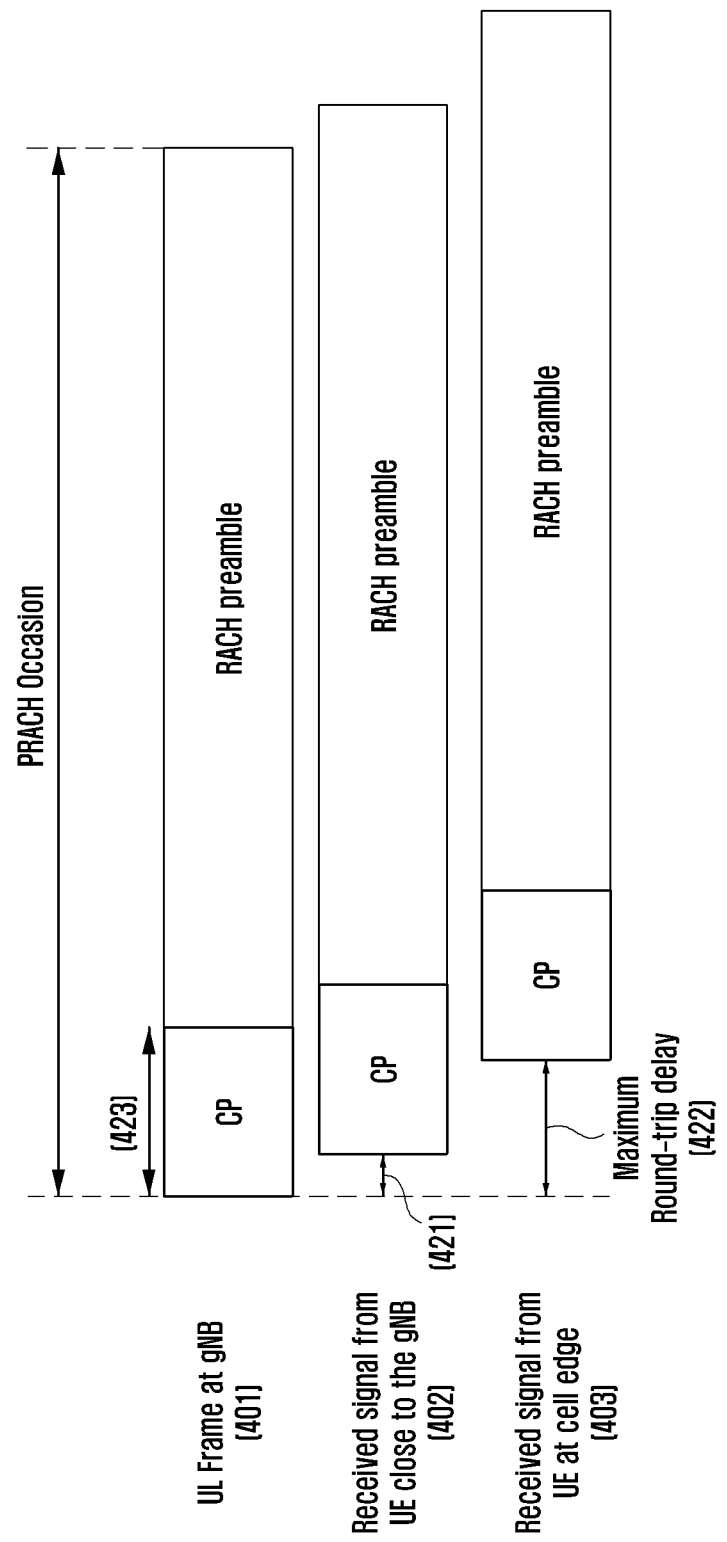
FIG. 4 is a diagram illustrating the relationship between a base station operation frame and a PRACH preamble reception timing, in association with a round trip delay between a base station and a user equipment (UE) in the 5G system according to an embodiment of the disclosure.

FIG. 4 is a diagram illustrating the relationship between a base station operation frame and a PRACH preamble reception timing, in association with a round trip delay between a base station and a user equipment (UE) in the 5G system according to an embodiment of the disclosure.

Referring to FIG. 4, case 401 shows an uplink frame of a base station. Case 402 shows a timing at which a base station receives a signal transmitted from a UE disposed in a location close to the base station. A timing error from the uplink frame of the base station may exist as much as a round trip delay 421 between the UE and the base station. Case 403 shows a timing at which a base station receives a signal transmitted from a UE disposed in an edge of a cell. In this instance, a round trip delay between the UE and the base station may be maximum. In the 5G system, the maximum round trip delay 422 of the cell is designed not to exceed a CP length 423.

Figure 5:
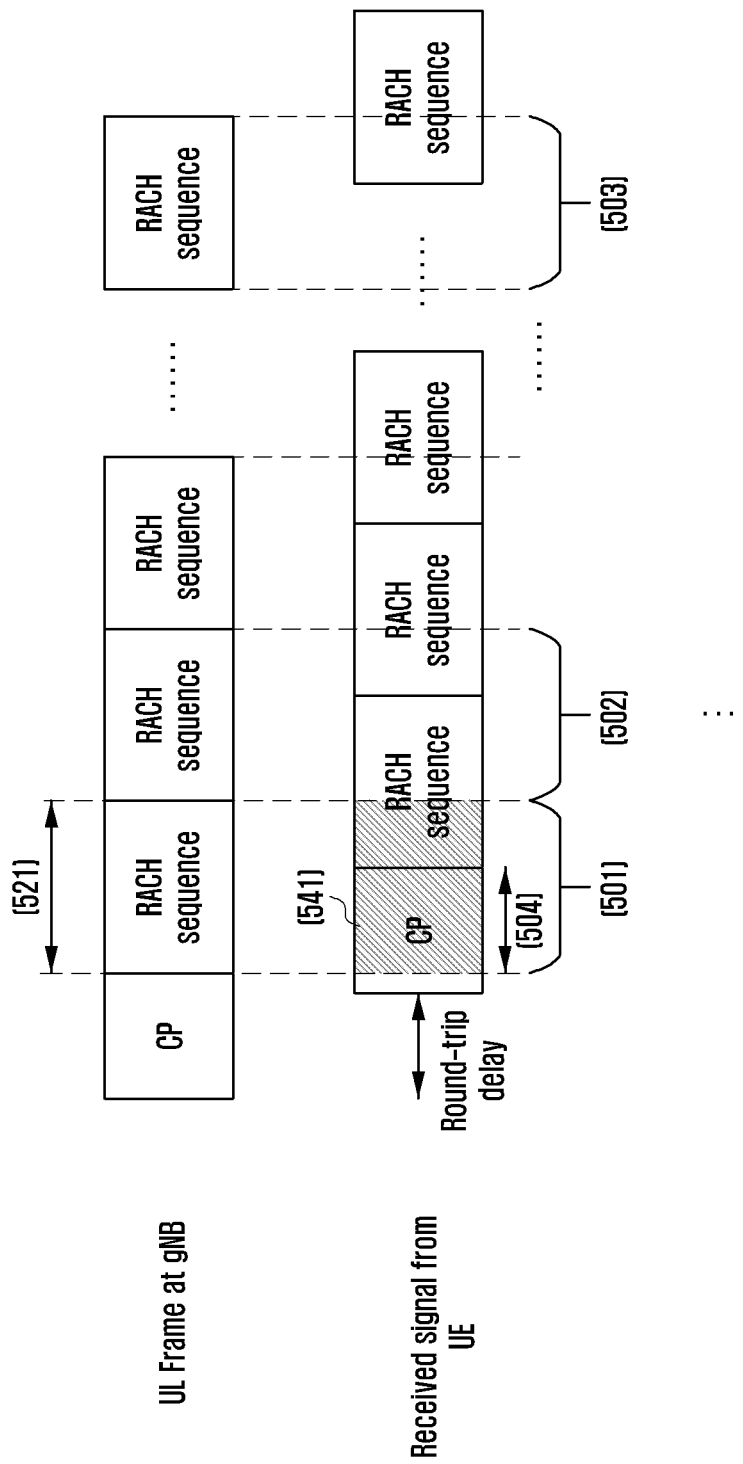
FIG. 5 is a diagram illustrating a method of measuring a round trip delay between a base station and a UE based on a PRACH preamble of the 5G system according to an embodiment of the disclosure.

FIG. 5 is a diagram illustrating a method of measuring a round trip delay between a base station and a UE based on a PRACH preamble of the 5G system according to an embodiment of the disclosure.

Referring to FIG. 5, a random access preamble signal that a base station receives from a UE may be received in a manner of applying an offset of a round trip delay. The base station may store a received signal 541 corresponding to a section 501 corresponding to the length 521 of a RACH sequence in a memory by aligning with its uplink frame section. The base station may calculate a cross correlation between a received signal 541 and an already known RACH sequence, and may calculate an estimated value 504 of the round trip delay of the received signal. In the disclosure, a detailed method of calculating a cross correlation is not limited. The base station may perform the same operation in a subsequent section 502 or another section 503 in a PRACH occasion. In the case in which the same operation is performed with respect to a plurality of sections, a combining gain may be obtained from a plurality of RACH sequences obtained therefrom.

Figure 6:
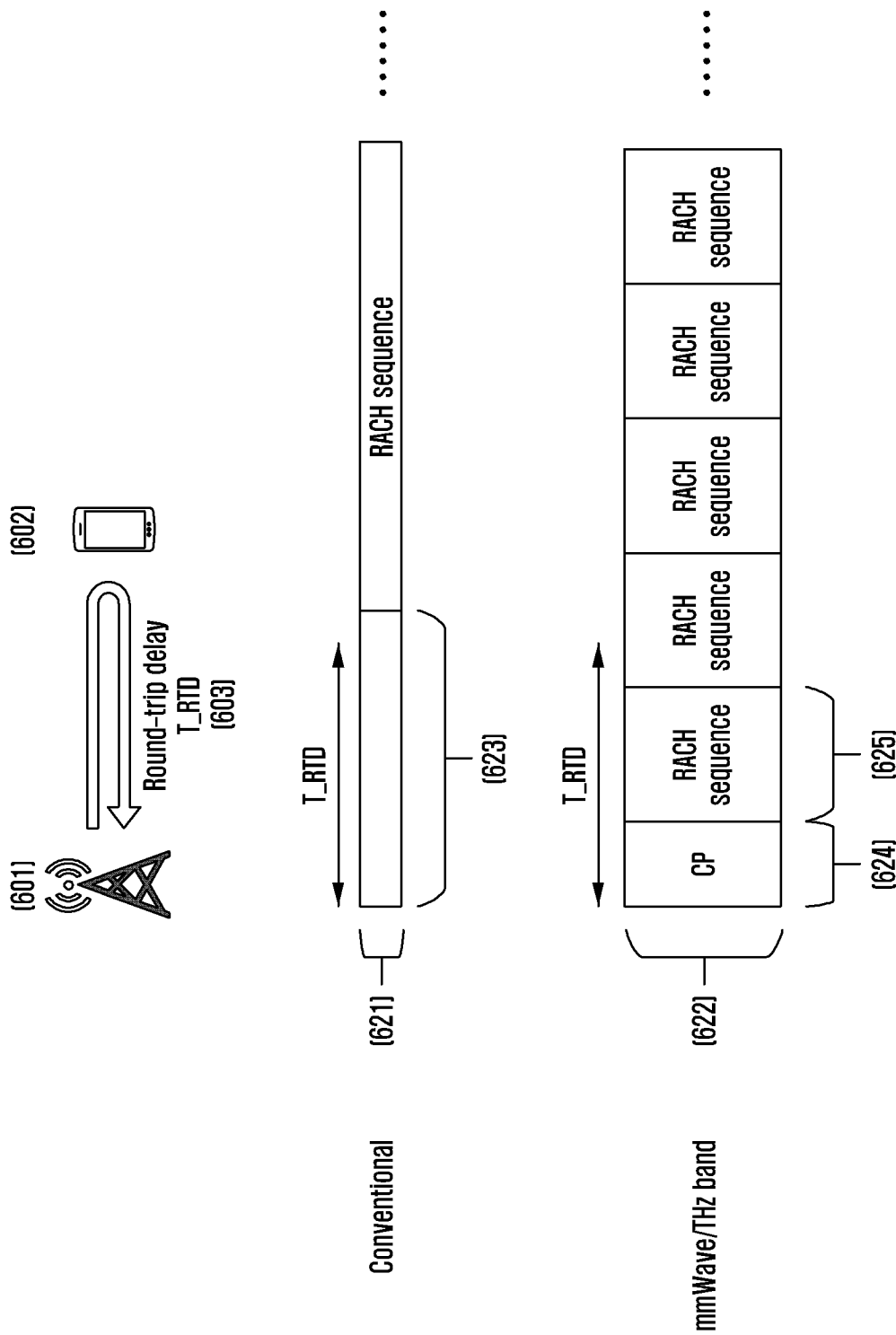
FIG. 6 is a diagram illustrating the case in which a subcarrier spacing is increased and a symbol length is decreased in a communication system using a high-frequency band according to an embodiment of the disclosure.

FIG. 6 is a diagram illustrating the case in which a subcarrier spacing is increased and a symbol length is decreased in a communication system using a high-frequency band according to an embodiment of the disclosure.

Referring to FIG. 6, a round trip delay 603 between a base station 601 and a UE 602 may be determined based on a physical distance based on the location of the base station and the location of the UE. In the case in which a frequency higher than a frequency band that the communication system of the related art uses is used, a subcarrier spacing may be increased to avoid a phase noise problem and a frequency bandwidth 622 wider than a frequency bandwidth 621 that has been used for the PRACH transmission of the related art may be used. In addition, a symbol length is decreased when a higher frequency band is used, and thus, a CP section length 623 that is longer than the round trip delay 603 is decreased when a higher frequency is used, and a RACH sequence length 625, as well as a CP section length 624, may be decreased to be shorter than the round trip delay 603.

Figure 7:
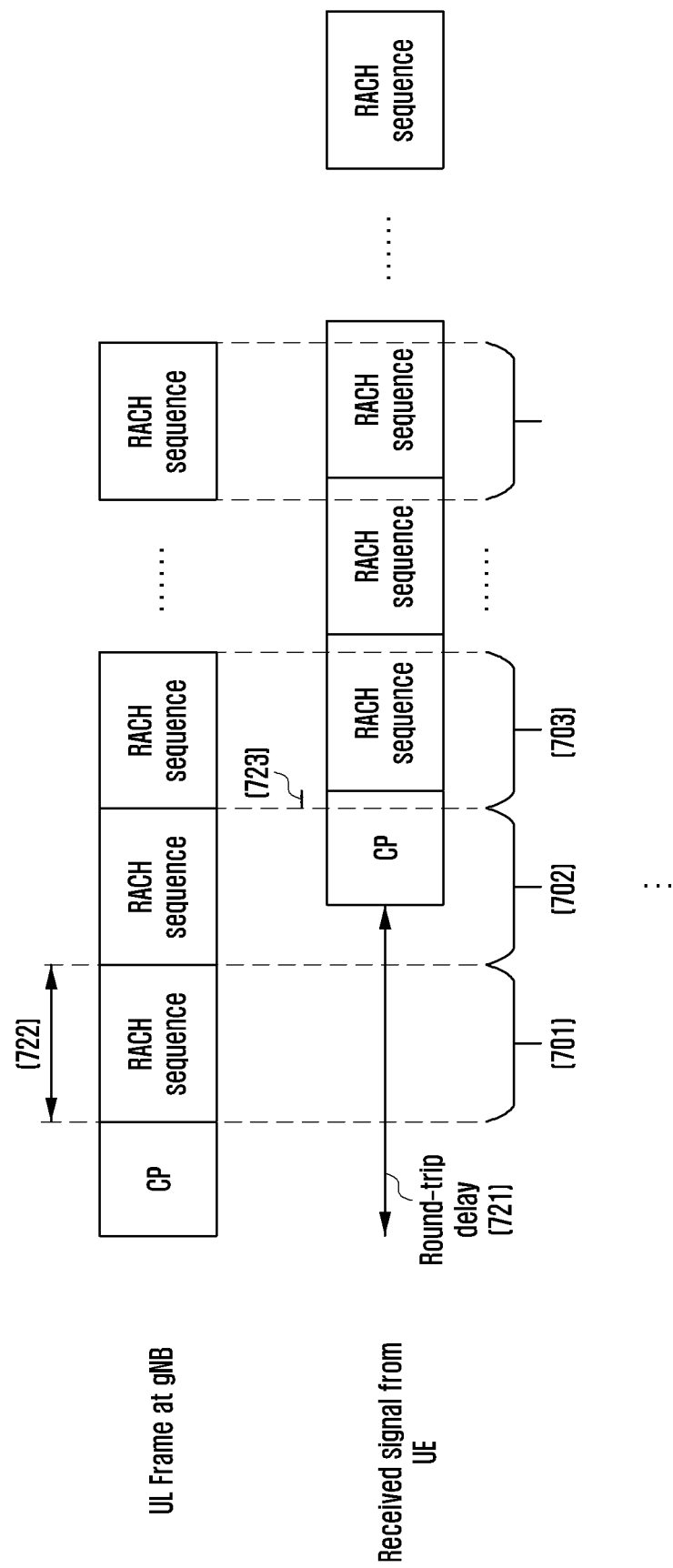
FIG. 7 is a diagram illustrating a PRACH signal received when the round trip delay between a base station and a UE exceeds a 1 random access channel (RACH) sequence section length in the case in which the PRACH structure of the related art is used according to an embodiment of the disclosure.

FIG. 7 is a diagram illustrating a PRACH signal received when the round trip delay between a base station and a UE exceeds a 1 RACH sequence section length in the case in which the PRACH structure of the related art is used according to an embodiment of the disclosure.

Referring to FIG. 7, it is illustrated that a round trip delay 721 between a UE and a base station is longer than a RACH sequence length 722. In the case of using a scheme in consideration of a PRACH structure designed so that a round trip delay between the UE and the base station is shorter than a RACH sequence length, in the same manner as the 5G system of the related art, a signal for calculating a cross correlation value may not be normally received in sections 701 and 702. In addition, a round trip delay 723 estimated based on a signal received in a second 703 may be estimated to be shorter than the actual round trip delay 721 due to the cyclic repetition structure of a RACH sequence. The estimated round trip delay 723 and the actual round trip delay 721 may have a difference corresponding to an integer-fold of the RACH sequence length.

Therefore, it is recognized that a round trip delay is inappropriately estimated using the PRACH structure of the related art in the state in which a round trip delay that may occur in a high frequency band of FIG. 6 is longer than a 1 RACH sequence section.

Figure 8:
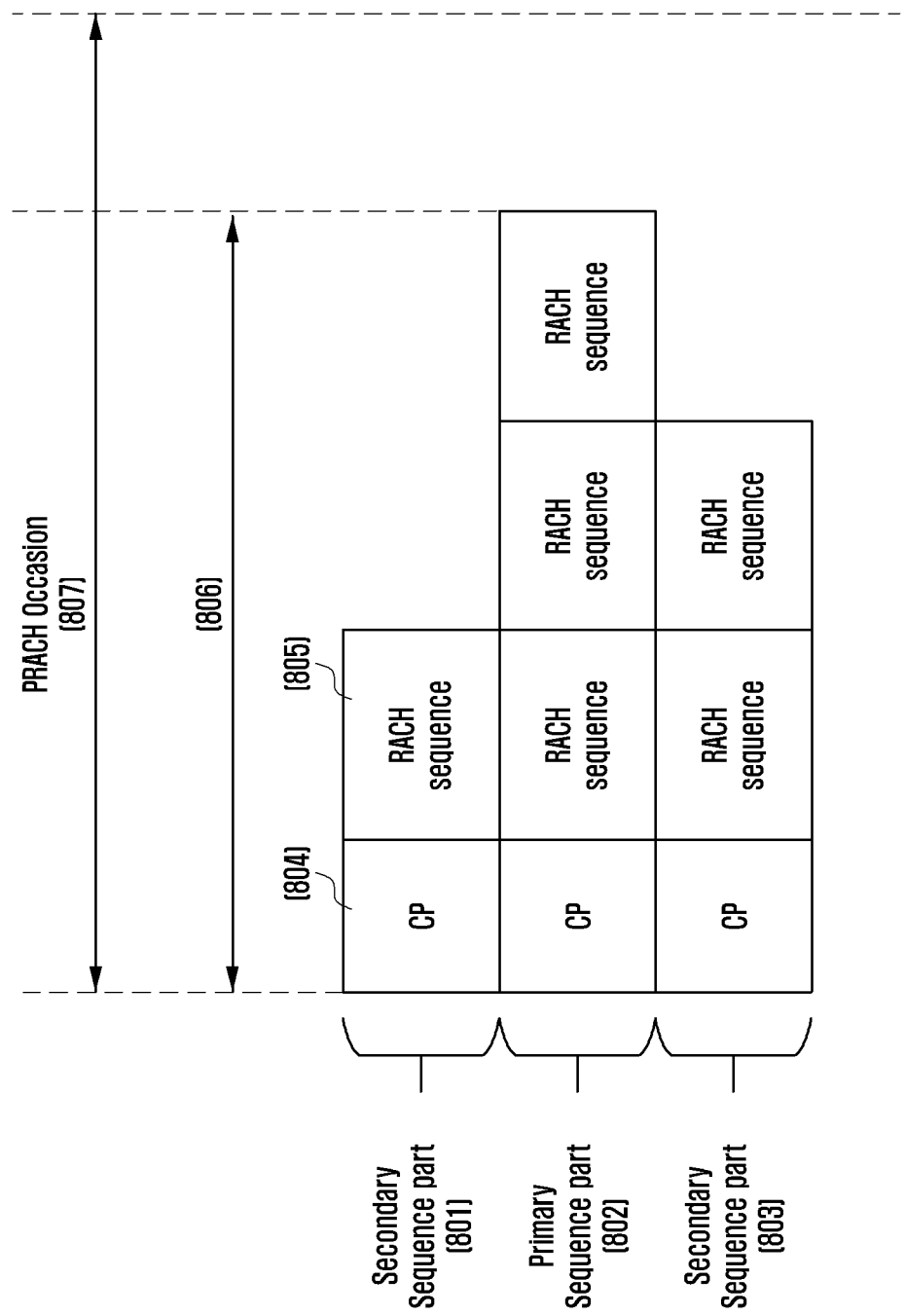
FIG. 8 is a diagram illustrating a PRACH structure provided in a structure extended in multiple dimensions according to an embodiment of the disclosure.

FIG. 8 is a diagram illustrating a PRACH structure provided in a structure extended in multiple dimensions according to an embodiment of the disclosure.

Referring to FIG. 8, a PRACH structure that is extended in multiple dimensions according to an embodiment of the disclosure may have a structure that transmits an additional RACH sequence using an additional frequency band when compared to the related art case. Specifically, a PRACH signal according to an embodiment of the disclosure includes one or more primary sequence parts 802 and one or more secondary sequence parts 801 and 803, and each sequence part has a structure including a CP 804 and in which a RACH sequence 805 is repeated in a predetermined number of times. In this instance, different sequence parts may be structures in which a RACH sequence is repeated in a different number of times, respectively. However, for a predetermined purpose, the number of times that a RACH sequence is repeated may be the same for some sequence parts. In this instance, for a RACH sequence located in the same sequence part, the same sequence may be used. In the case in which sequence parts are different from each other, sequences used for RACH sequences may be identical to each other, or may be different from each other. The fact that sequences are different means that the type of sequence, a root index, a length, and the like may be different from each other. The length 806 of the primary sequence part may be designed to be at least 1 RACH sequence length longer than the maximum round trip delay within a cell. The length 807 of a single PRACH occasion may be designed to be greater than or equal to at least the length 806 of the primary sequence part. In this instance, the primary sequence part may be used for measuring a delay within a symbol, and the secondary sequence part may be used for measuring a delay in units of symbols. However, for a predetermined purpose, each sequence part may be used for a purpose different from the above-description. According to an embodiment, a RACH sequence included in each of the primary sequence part 802 and the secondary sequence parts 801 and 803 may be a sequence having the same size. However, some sequences may be designed to have different sizes from each other, when needed. For example, a RACH sequence included in the primary sequence part 802 may be designed based on a sequence having a size larger than that of a RACH sequence included in the secondary sequence parts 801 and 803.

Figure 9:
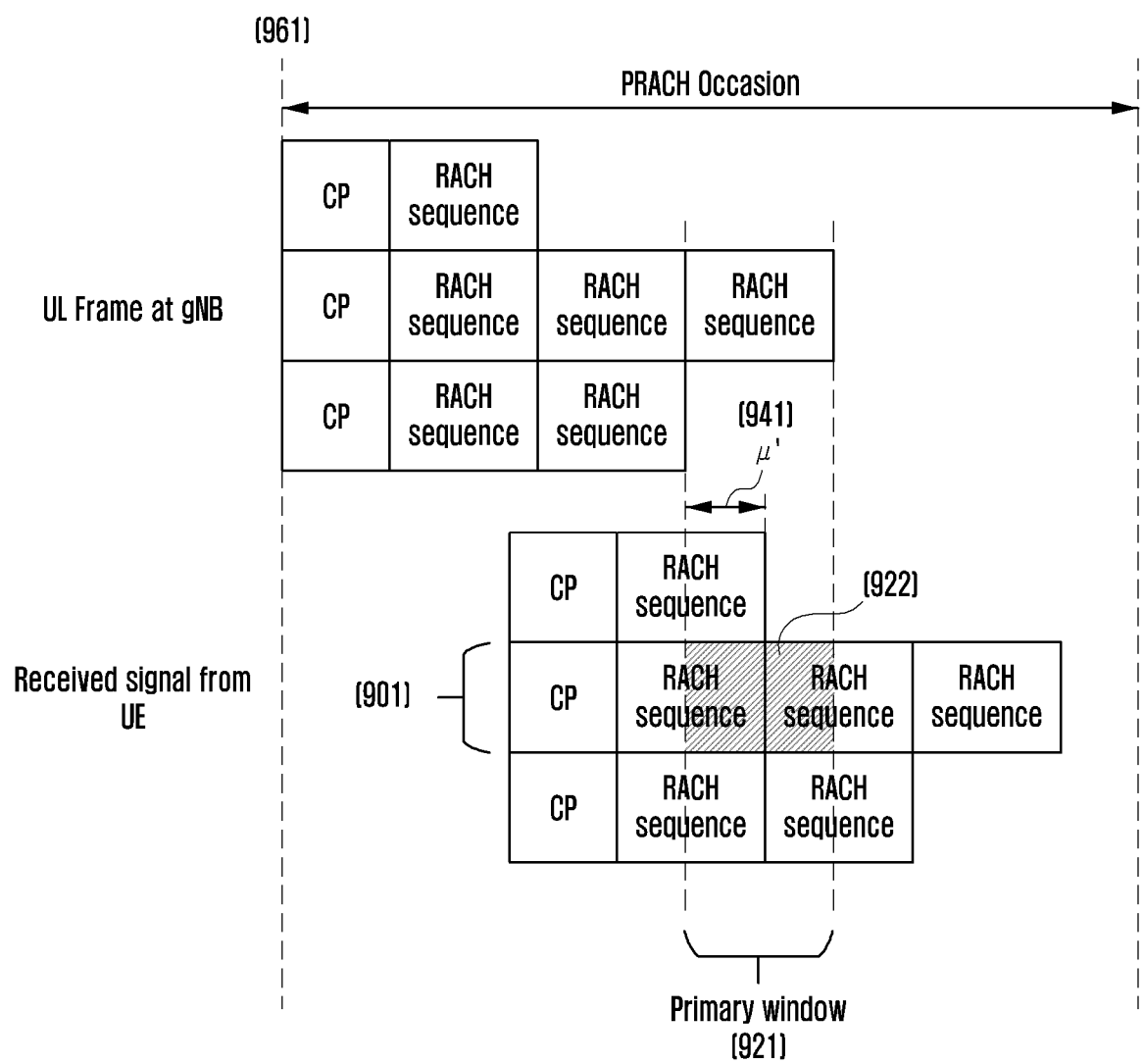
FIG. 9 is a diagram illustrating a method of measuring a delay within a symbol based on a PRACH structure according to an embodiment of the disclosure.

FIG. 9 is a diagram illustrating a method of measuring a delay within a symbol based on a PRACH structure according to an embodiment of the disclosure.

Referring to FIG. 9, a random access preamble signal that a base station receives from a user equipment (UE) may be received in a manner of applying an offset of a round trip delay to a start point 961 of an PRACH occasion of the base station. The base station may configure, as a primary window 921, a predetermined RACH sequence section having a length of at least 1 RACH sequence from a location obtained by applying an offset of at least the maximum round trip delay to the start point 961 of the PRACH occasion by aligning with the uplink frame section of the base station. The primary window 921 may be configured so that a RACH sequence of a primary sequence part included in a PRACH signal that a UE transmits in a cell is received over the whole section of the corresponding primary window 921 as shown in FIG. 9. This is to prevent the continuity of a received signal in a window from being disconnected. The base station may calculate a cross correlation between an already known RACH sequence and a received signal 922 corresponding to the primary window section of a subcarrier band 901 corresponding to the primary sequence part of a signal received from the UE, so as to calculate μ' 941 that is the estimated value of a delay within a symbol of the received signal. According to one of the methods of calculating a cross correlation, the base station may multiply, in the frequency domain, the complex conjugate value of a RACH sequence already known and the received signal 922 corresponding to the primary window 921 of the subcarrier band 901 corresponding to the primary sequence part of a signal received from the UE, may perform inverse discrete Fourier transform (IDFT), and may obtain a peak value from a sample to which an offset of a round trip delay is applied. In this instance, a detected offset value may be estimated as a delay within a symbol of a transmission UE. The above-described example is an embodiment of the disclosure, and the disclosure is not limited to a detailed method of calculating a cross correlation.

Figure 10:
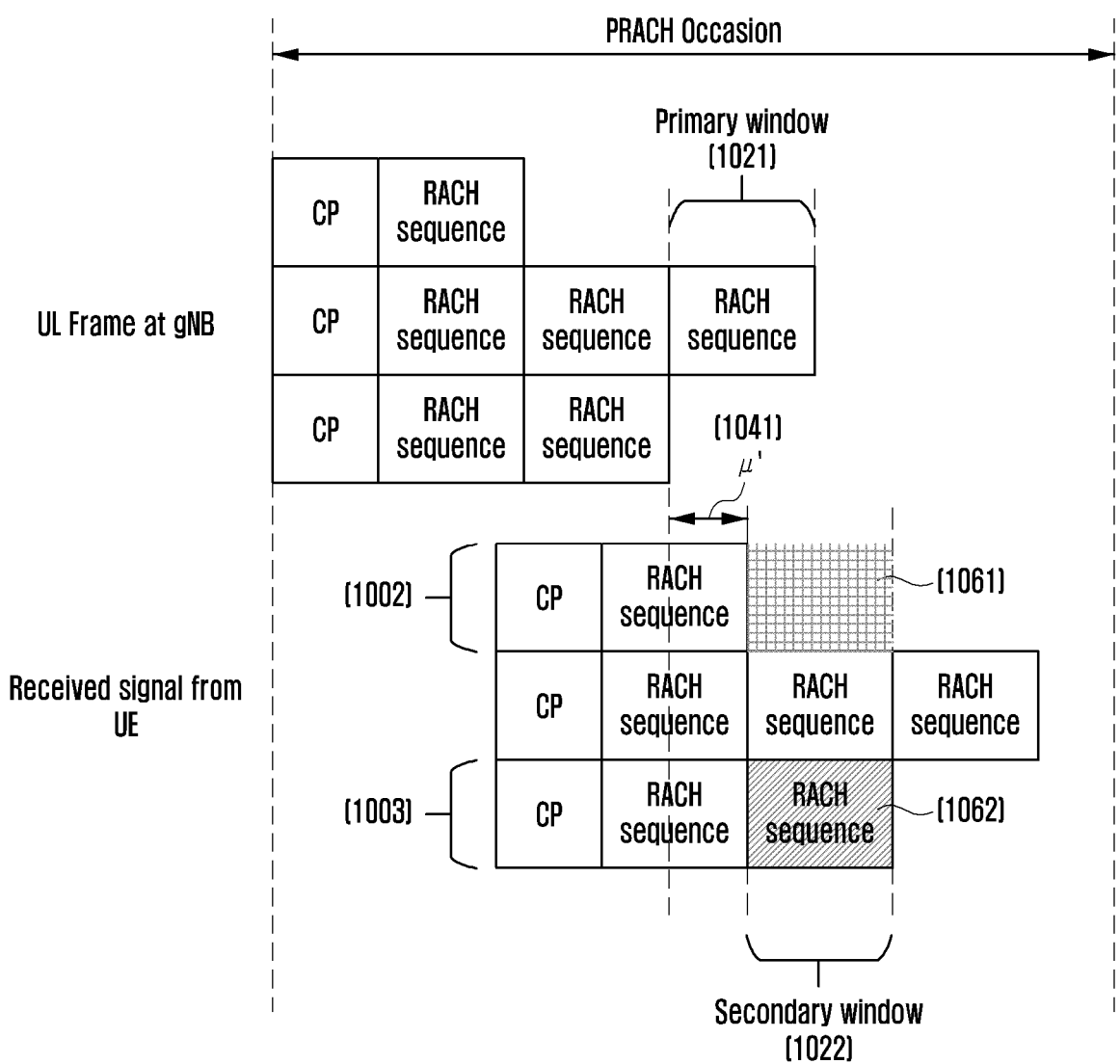
FIG. 10 is a diagram illustrating a method of measuring a delay in units of symbols based on a PRACH structure according to an embodiment of the disclosure.

FIG. 10 is a diagram illustrating a method of measuring a delay in units of symbols based on a PRACH structure according to an embodiment of the disclosure.

Referring to FIG. 10, the base station may configure a secondary window 1022 at a location obtained by applying an offset to a primary window 1021, the offset corresponding to μ' 1041, which is the estimated value of a round trip delay within a symbol of a received signal and is estimated according to the method described in FIG. 9. In this instance, the boundary of the secondary window may be configured to be aligned with the boundary of the symbol of the received signal. This is to prevent the case in which only some of a RACH sequence in subcarrier bands 1002 and 1003 corresponding to secondary sequence parts is received in the secondary window section, and is demodulated. The base station may calculate a cross correlation between an already known RACH sequence and a received signal 1061 and 1062 corresponding to the secondary window section of the subcarrier band 1002 and 1003 corresponding to the secondary sequence part of a signal received from the UE, and may determine whether a RACH sequence is present within the secondary window 1022 of the secondary sequence part corresponding to each subcarrier band 1002 and 1003. Alternatively, the base station may determine whether a RACH sequence is present using the strength of a received signal. In the disclosure, a method of determining whether a RACH sequence is present based on the signal 1061 and 1062 is not limited to a specific method. The base station may determine a round trip delay of k' in units of symbols depending on a combination of existence and nonexistence of a RACH sequence in the signals 1061 and 1062. For example, in the case in which a RACH sequence is not detected from both the signals 1061 and 1062, it corresponds to k'=0 and the round trip delay between the UE and the base station may be calculated as μ'+(RACH sequence length)× k'=μ'. In the case in which a RACH sequence is not detected from the signal 1061 and a RACH sequence is detected from the signal 1062, it corresponds to k'=1 and the round trip delay between the UE and the base station may be calculated as μ'+(RACE sequence length)×k'=μ'+(RACH sequence length). For example, in the case in which a RACH sequence is detected from both the signals 1061 and 1062, it corresponds to k'=2 and the round trip delay between the UE and the base station may be calculated as μ'+(RACH sequence length)×k'=μ'+(RACH sequence length)×2. In the case in which detection happens that is not allowed due to a PRACH structure, such as the case in which a RACH sequence is detected from the signal 1061 and a RACH sequence is not detected from the signal 1062, it may be determined as missed-detection.

Figure 11:
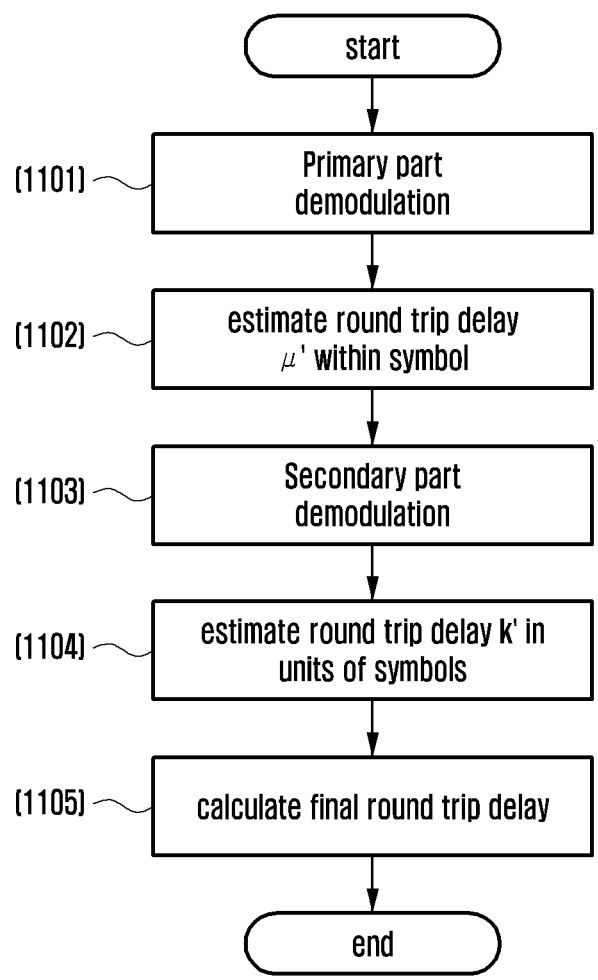
FIG. 11 is a flowchart illustrating a method of measuring a round trip delay based on a PRACH structure according to an embodiment of the disclosure.

FIG. 11 is a flowchart illustrating a method of measuring a round trip delay based on a PRACH structure according to an embodiment of the disclosure.

Referring to FIG. 11, a base station may define a primary window corresponding to at least one RACH sequence section at a location obtained by applying an offset of at least the maximum round trip delay to the start point of a PRACH occasion, and may perform demodulation on a primary sequence part of a signal received in the corresponding primary widow in operation 1101. In operation 1102, the base station may estimate a round trip delay μ' within a symbol from the signal demodulated in operation 1101. According to an embodiment, by multiplying the signal demodulated in operation 1101 and the complex conjugate value of a RACH sequence already known, and performing an IDFT process, a circular correlation value may be obtained, and that a round trip delay μ' within a symbol may be estimated by detecting the peak of the circular correlation value. However, the detailed method of performing operation 1102 is not limited thereto. In operation 1103, the base station may define a secondary window corresponding to at least one RACH sequence section at a location obtained by applying a previously estimated offset of μ' to a predetermined point in time, and may perform demodulation on a secondary sequence part of a signal received in the corresponding secondary window. According to an embodiment, the base station may configure a secondary window at a location obtained by applying an offset of to the start point of the primary window. However, a location used as a reference point for configuring a secondary window according to various modified PRACH structures provided in the disclosure is not limited to the start point of a primary window. In operation 1104, the base station may determine whether a RACH sequence is received in one or more secondary sequence parts demodulated in operation 1103 using an already known RACH sequence signal. Depending on a combination of existence or nonexistence of a received RACH sequence associated with the one or more secondary sequence parts, the base station may estimate a round trip delay k' in units of symbols. The method of estimating k' is not limited to a predetermined scheme. In operation 1105, the base station may calculate the final round trip delay based on the previously estimated μ' and k' according to Equation 1.

$$\text{Final round trip delay} = \mu' = (\text{RACH sequence length}) \times k' \quad \text{Equation 1}$$

Figure 12:
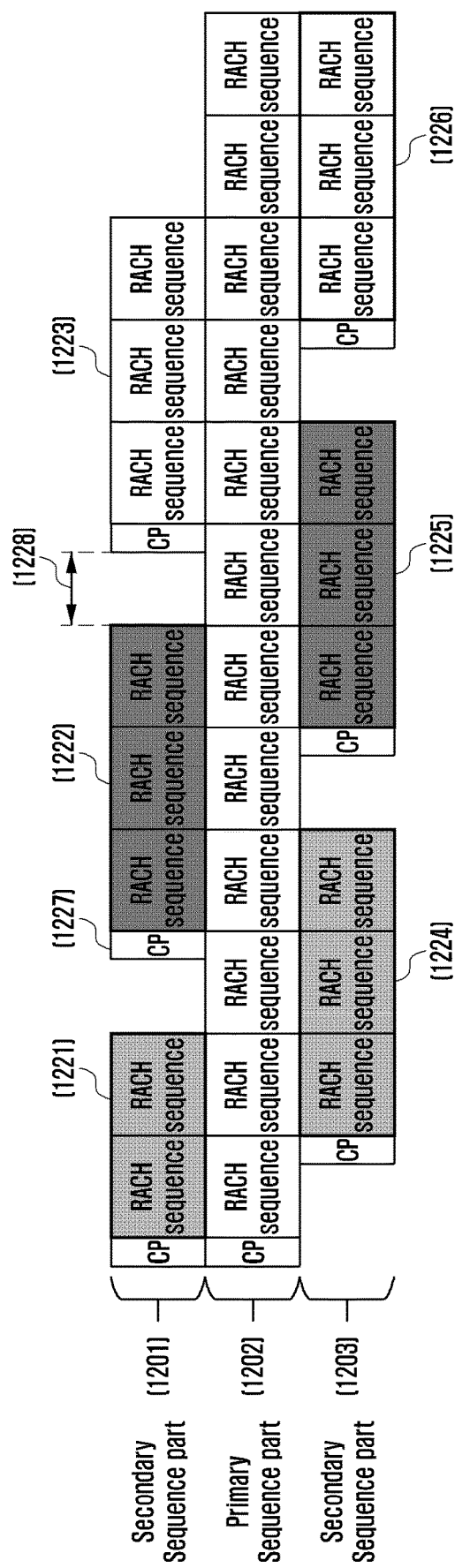
FIG. 12 is a diagram illustrating a PRACH structure including a preamble structure that uses a multi-root sequence according to an embodiment of the disclosure.

FIG. 12 is a diagram illustrating a PRACH structure including a preamble structure that uses a multi-root sequence according to an embodiment of the disclosure.

Referring to FIG. 12, a PRACH structure according to the embodiment may include one or more primary sequence parts 1202 in which an identical RACH sequence symbol is repeated, and one or more secondary sequence parts 1201 and 1203 including multi-root sequences. Each signal 1221, 1222, 1223, 1224, 1225, and 1226 of the secondary sequence parts 1201 and 1203 is configured based on a multi-root sequence, and thus a delay in units of symbols may be measured using the disposition of multiple root sequences, in addition to using whether the signal is present. Although FIG. 12 illustrates that signals 1221 and 1224, signals 1222 and 1225, and signals 1223 and 1226 use identical RACH sequences, respectively, they are not necessarily use the same RACH sequences. Even in the case of using only the fixed number of sequence parts, the PRACH structure of the embodiment may be extended to have a form capable of measuring a longer round trip delay by increasing the number of root sequences used. In this instance, a CP 1227 and a guard time 1228 may be present between sections respectively including different multi-root sequence signals.

Figure 13:
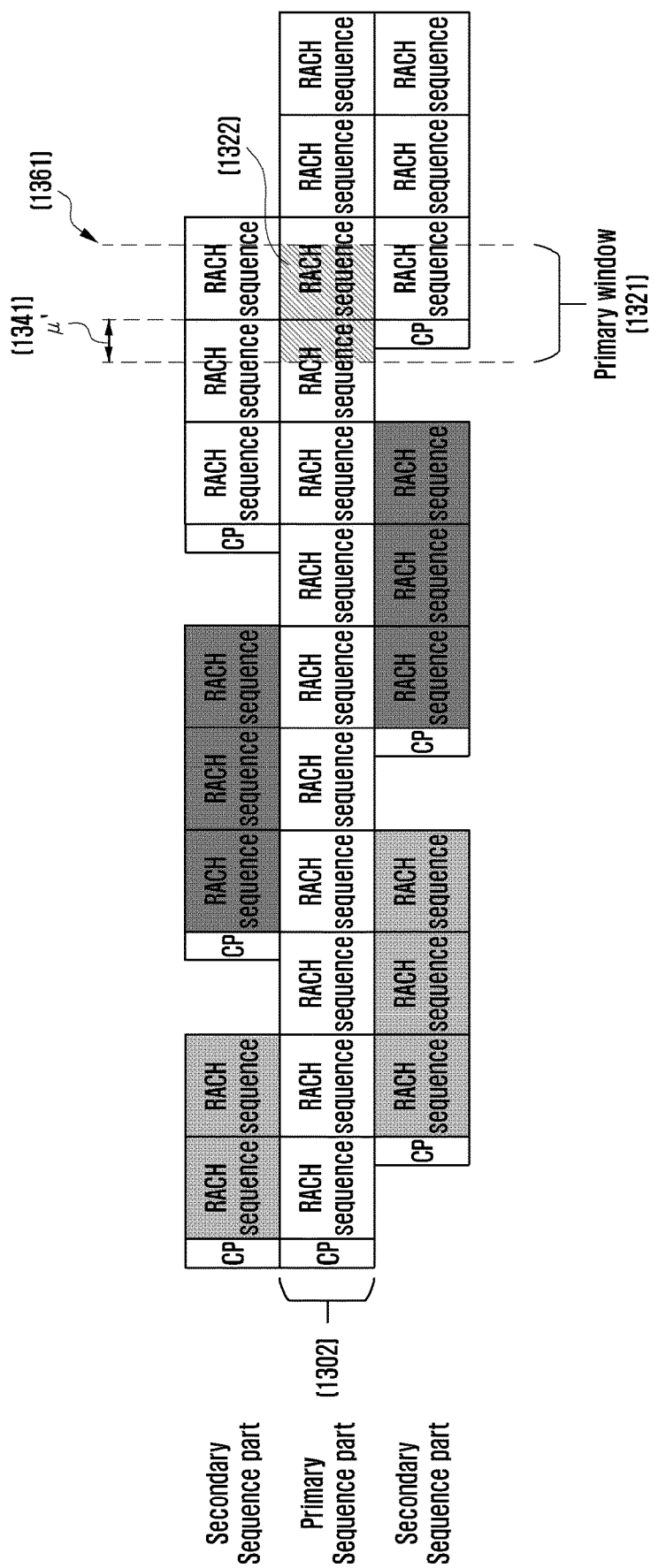
FIG. 13 is a diagram illustrating a method of measuring a delay within a symbol based on a PRACH structure including a preamble structure that uses a multi-root sequence according to an embodiment of the disclosure.

FIG. 13 is a diagram illustrating a method of measuring a delay within a symbol based on a PRACH structure including a preamble structure that uses a multi-root sequence according to an embodiment of the disclosure.

Referring to FIG. 13, in the case in which a delay from the start point of a RACH occasion of a base station is not present, the base station may configure, as a primary window 1321, a section corresponding to at least a single RACH sequence length from a location 1361 where reception of the last RACH sequence of a primary sequence part 1302 is expected to be completed, may perform demodulation on a signal 1322 received in the corresponding window of the primary sequence part 1302, and may estimate a round trip delay µ' 1341 within a symbol.

Figure 14:
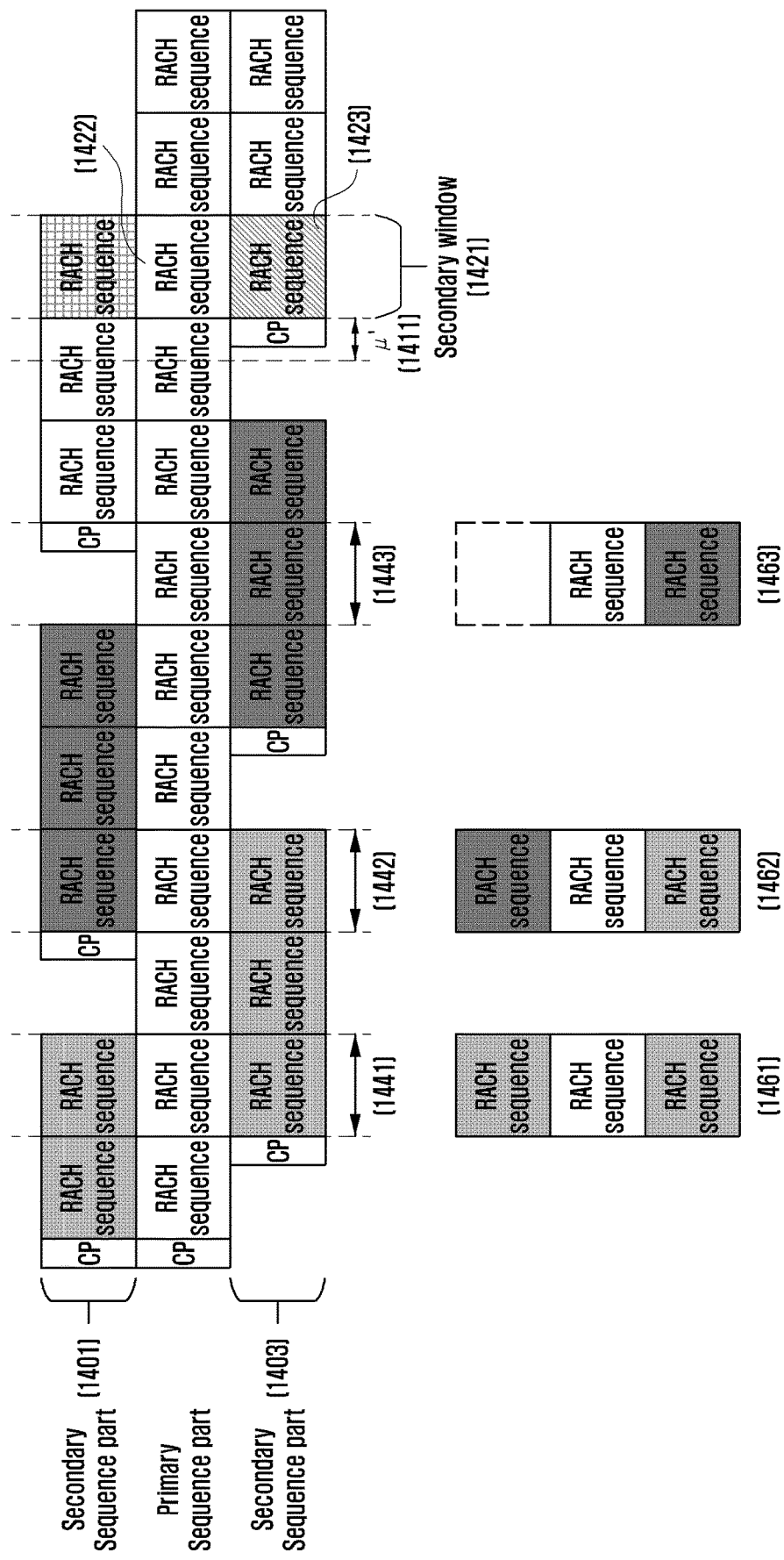
FIG. 14 is a diagram illustrating a method of measuring a delay in units of symbols based on a PRACH structure including a preamble structure that uses a multi-root sequence according to an embodiment of the disclosure.

FIG. 14 is a diagram illustrating a method of measuring a delay in units of symbols based on a PRACH structure including a preamble structure that uses a multi-root sequence according to an embodiment of the disclosure.

Referring to FIG. 14, the base station may configure, as a secondary window 1421, a section obtained by applying an offset of µ' 1411 that is an estimated round trip delay within a symbol to the start point of the primary window configured in the process of FIG. 13. In this instance, the secondary window is in the state of being aligned with the symbol spacing of a received signal. The base station may perform demodulation on signals 1422 and 1423 received in the secondary window 1421 of secondary sequence parts 1401 and 1403. In this instance, depending on a round trip delay in units of symbols, a RACH sequence combination may differ in the secondary window 1421. The base station may estimate a round trip delay in units of symbols according to a combination of RACH sequences received in the secondary window 1421. For example, a RACH sequence combination 1461, a RACH sequence combination 1462, and a RACH sequence combination 1463 are examples of a RACH sequence combination received when delays in units of symbols are 10 symbol 1441, 8 symbol 1442, and 5 symbol 1443, respectively. That is, in the case in which a RACH sequence combination of the secondary sequence parts 1401 and 1403 received in the secondary window 1421 is the RACH sequence combination 1461, a round trip delay in units of symbols may be estimated to be 10 symbols. In the case of the RACH sequence combination 1462, a round trip delay in units of symbols may be estimated to be 8 symbols. In the case of the RACH sequence combination 1463, a round trip delay in units of symbols may be estimated to be 5 symbols.

Figure 15:
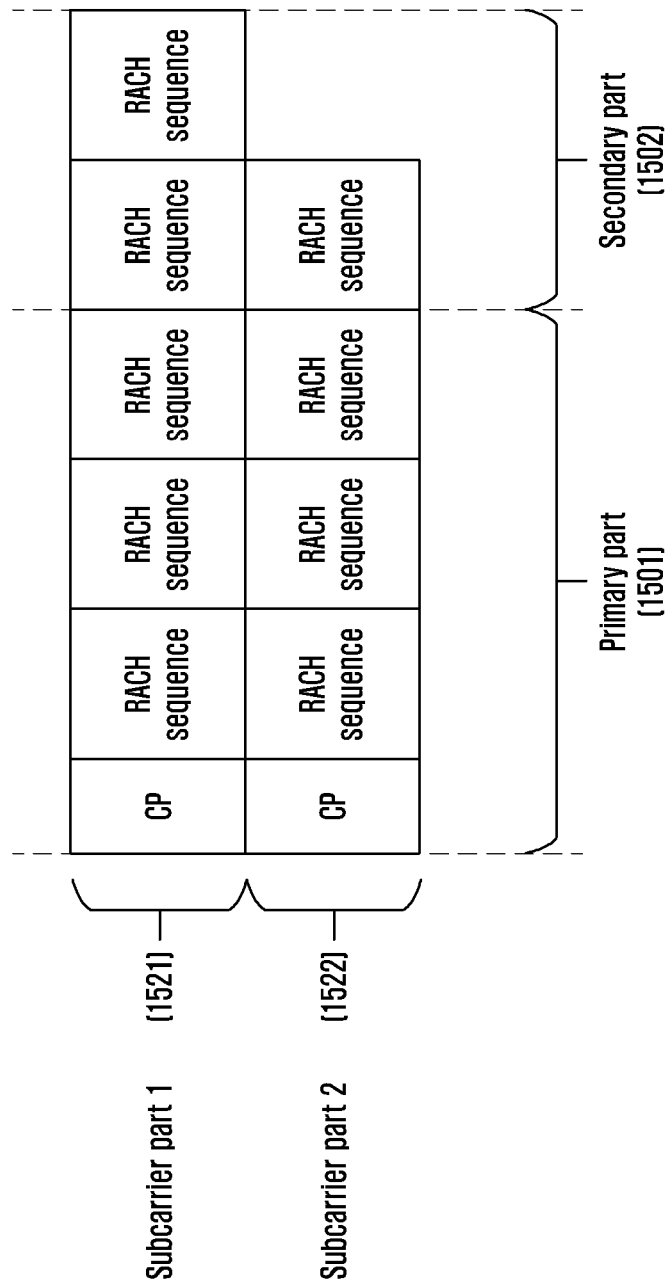
FIG. 15 is a diagram illustrating a PRACH structure provided in a structure extended in multiple dimensions and having a combining gain according to an embodiment of the disclosure.

FIG. 15 is a diagram illustrating a PRACH structure provided in a structure extended in multiple dimensions and having a combining gain according to an embodiment of the disclosure.

Referring to FIG. 15, the corresponding PRACH structure may be divided into a primary part 1501 and a secondary part 1502. According to an embodiment, a primary part may be used to estimate a round trip delay within a symbol, and a secondary part may be used to estimate a round trip delay in units of symbols. However, the purpose of each part is not limited thereto. The length of the primary part may be configured to be at least the length of a single RACH sequence greater than or equal to the maximum round trip delay of a cell. Although FIG. 15 illustrates that all subcarrier parts 1521 and 1522 are configured to include the primary part 1501, configuration may be performed so that one or more subcarrier parts 1521 and 1522 selectively include the primary parts 1501 when needed. Generally, the length of the secondary part 1502 may be in a structure in which a RACH sequence is repeated a different number of times depending on a subcarrier part. However, the disclosure is not limited thereto. As another example, the secondary part 1502 may be configured as one or more secondary sequence parts including multi-root sequences, similar to the description which has been provided with reference to FIGS. 12 to 14. In this instance, the number of times that a RACH sequence is repeated in each subcarrier part may be the same, or may be different from each other. A secondary part may be configured selectively in one or more subcarrier parts, when needed.

Figure 16:
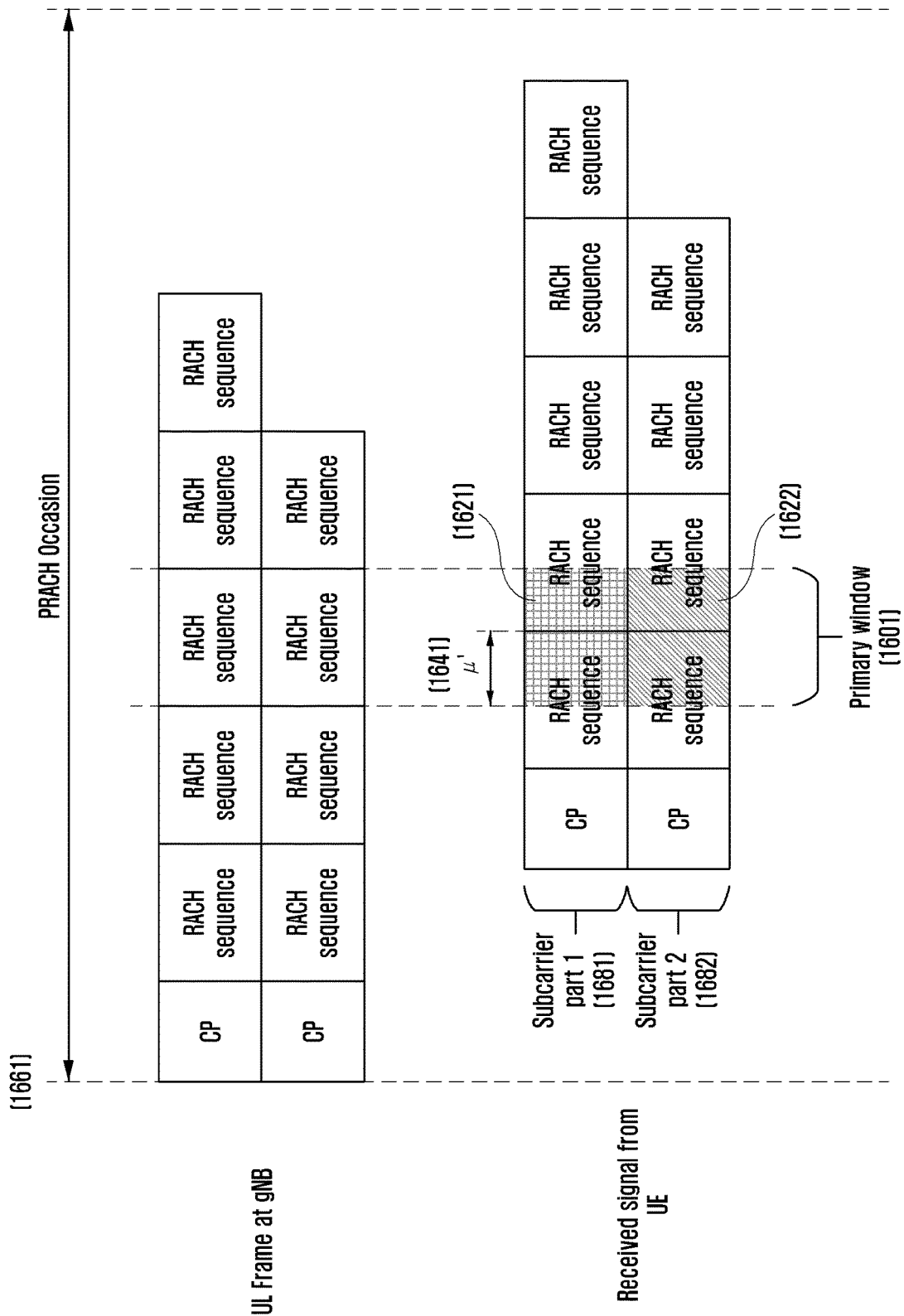
FIG. 16 is a diagram illustrating a method of measuring a delay within a symbol based on a PRACH structure provided in a structure extended in multiple dimensions and having a combining gain according to an embodiment of the disclosure.

FIG. 16 is a diagram illustrating a method of measuring a delay within a symbol based on a PRACH structure provided in a structure extended in multiple dimensions and having a combining gain according to an embodiment of the disclosure.

Referring to FIG. 16, a random access preamble signal that a base station receives from a UE may be received in a manner of applying an offset of a round trip delay to a start point 1661 of an PRACH occasion of the base station. The base station may configure, a primary window 1601, a predetermined RACH sequence section having a length of at least 1 RACH sequence from a location obtained by applying an offset of at least the maximum round trip delay to the start point 1661 of the PRACH occasion, by aligning with the uplink frame section of the base station. The base station may calculate a cross correlation between an already known RACH sequence and a received signal 1621 and 1622 corresponding to the primary window section of at least one subcarrier part 1681 and 1682 of a signal received from the UE, so as to calculate µ' 1641 that is the estimated value of a round trip delay of the received signal. In this instance, if a plurality of subcarrier parts is used, a combining gain may be obtained by combining the signals of respective subcarrier parts.

Figure 17:
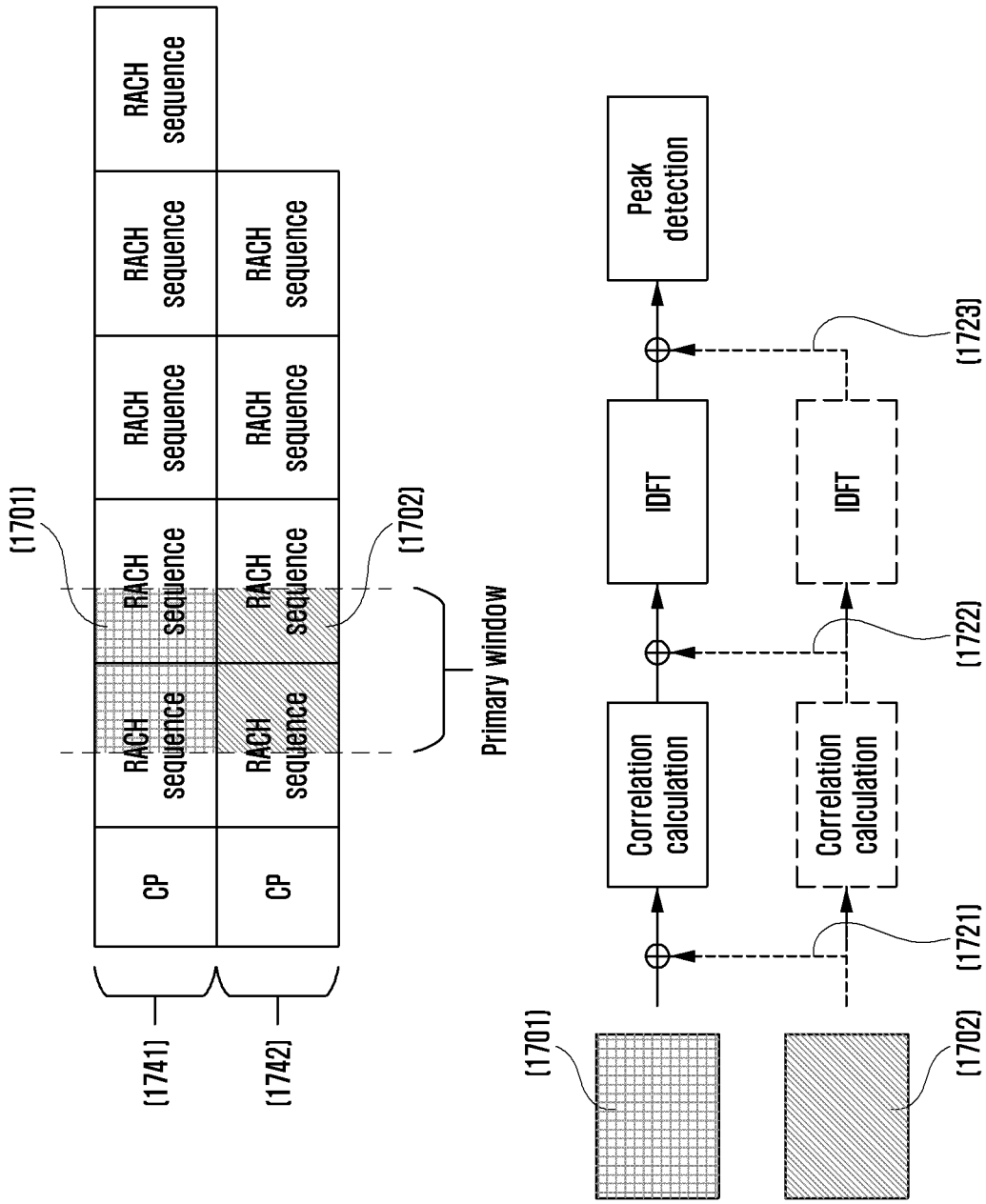
FIG. 17 is a diagram illustrating a combination method performed in one reception end based on a PRACH structure having a combining gain according to an embodiment of the disclosure.

FIG. 17 is a diagram illustrating a combination method performed in one reception end based on a PRACH structure having a combining gain according to an embodiment of the disclosure.

Referring to FIG. 17, in the process of obtaining a combination using received signals 1701 and 1702 corresponding to a primary window section of a plurality of subcarrier parts 1741 and 1742, a combining location, such as a previous part 1721 of a correlation calculation block, a previous part 1722 of an IDFT block, or a previous part 1723 of a preamble detection block, and the like, may be selected depending on the channel, calculation amount, required capacity of a receiver. The disclosure is not limited to a detailed method of obtaining a combining gain.

Figure 18:
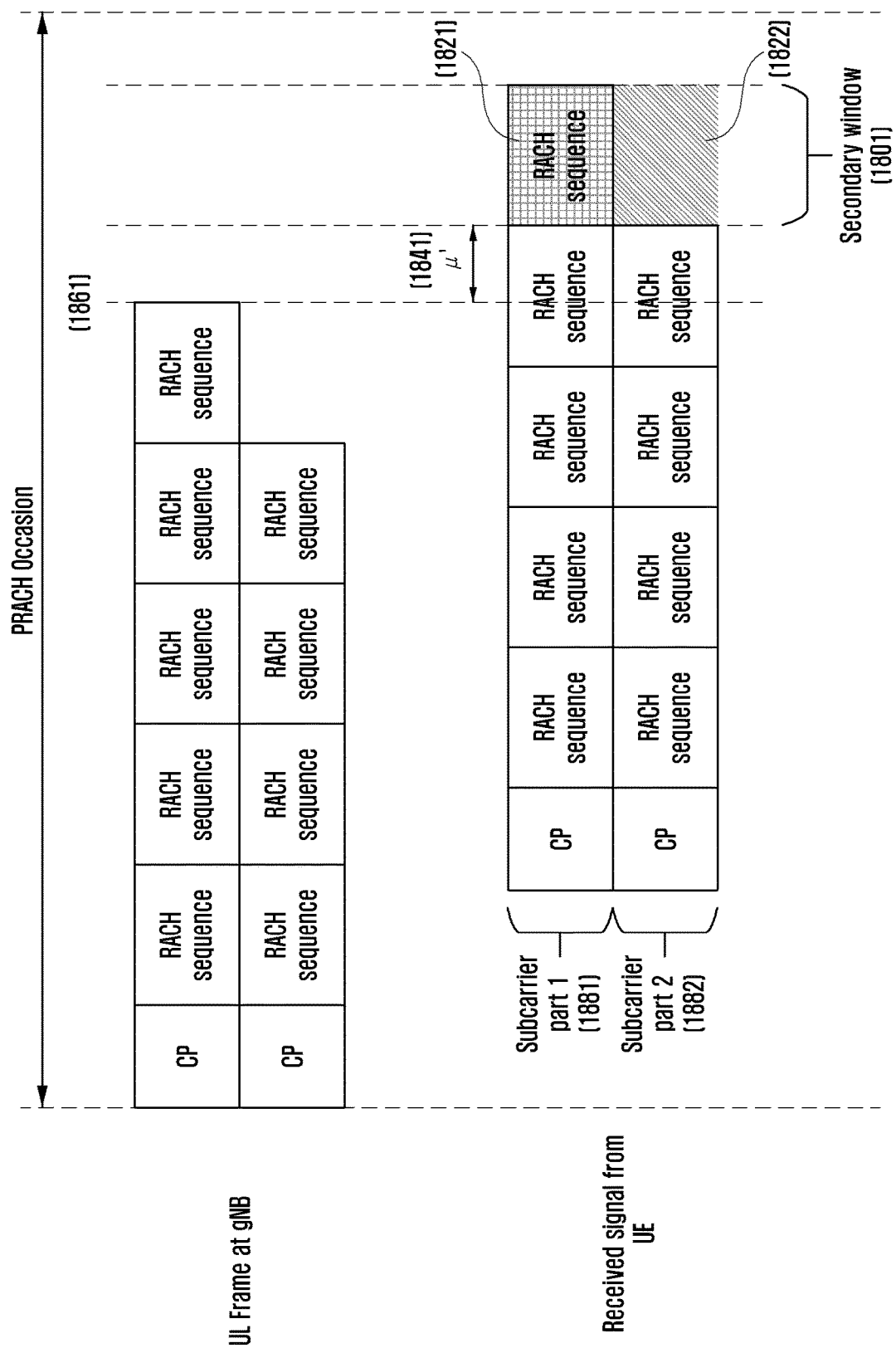
FIG. 18 is a diagram illustrating a method of measuring a delay in units of symbols based on a PRACH structure having a combining gain according to an embodiment of the disclosure.

FIG. 18 is a diagram illustrating a method of measuring a delay in units of symbols based on a PRACH structure having a combining gain according to an embodiment of the disclosure.

Referring to FIG. 18, a base station may configure a secondary window 1801 having a length of at least 1 RACH sequence from a location obtained by applying an offset of 1841, which is the estimated value of a round trip delay within a symbol, to a last point 1861 of a secondary part based on the uplink frame of the base station. The base station may calculate a cross correlation between an already known RACH sequence and received signals 1821 and 1822 corresponding to a secondary window section of one or more subcarrier parts 1881 and 1882 received from a UE, and may determine whether a RACH sequence is present. Alternatively, in the case in which the secondary part includes one or more secondary sequence parts including multi-root sequences, a round trip delay in units of symbols may be estimated based on a combination of RACH sequences received in the secondary window 1801. The base station may determine a round trip delay of k' in units of symbols depending on a combination of existence and nonexistence of a RACH sequence in the signals 1821 and 1822. The method of calculating the final round trip delay based on µ' 1841 that is the estimated value of a round trip delay within a symbol and k' that is a round trip delay in units of symbols will be performed in a method similar to the method described with reference to FIG. 10.

Figure 19:
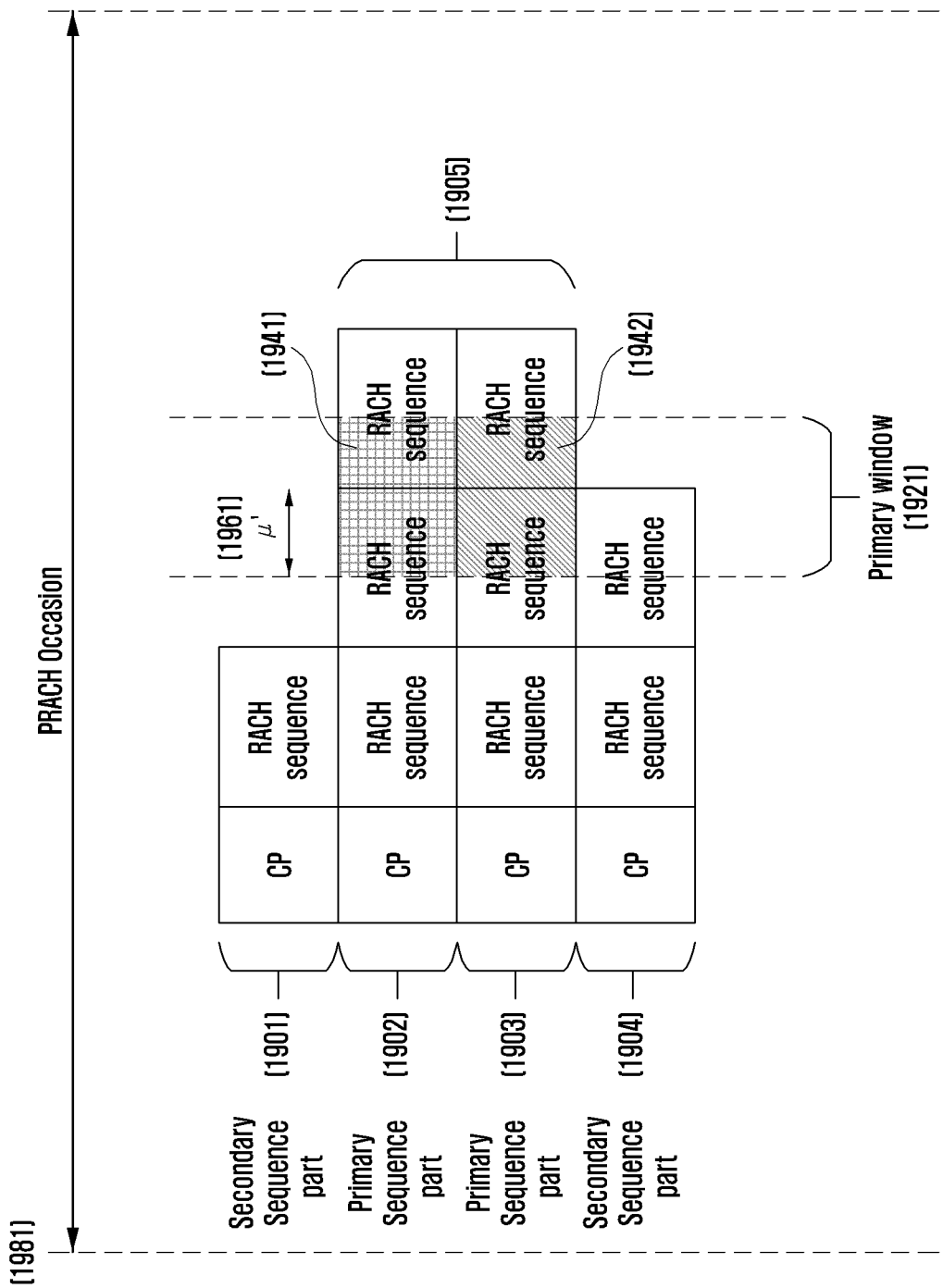
FIG. 19 is a diagram illustrating an alternative structure of a PRACH structure extended in multiple dimensions and having a combining gain according to an embodiment of the disclosure.

FIG. 19 is a diagram illustrating an alternative structure of a PRACH structure extended in multiple dimensions having a combining gain according to an embodiment of the disclosure.

Referring to FIG. 19, the corresponding embodiment shows one or more primary sequence parts 1902 and 1903 and one or more secondary sequence parts 1901 and 1904. In this instance, via respective primary sequence parts, a UE may transmit a sequence of the same root index or may transmit sequences of different root indices. In order to obtain a combining gain, the base station may configure, as a primary window 1921, a predetermined RACH sequence section having a length of at least 1 RACH sequence from a point obtained by applying an offset of at least the maximum round trip delay to a start point 1981 of the PRACH occasion, by aligning with the uplink frame section of the base station. The base station may calculate a cross correlation between an already known RACH sequence and a received signal 1941 and 1942 corresponding to the primary window section of at least one primary sequence part 1902 and 1903 of a signal received from the UE, so as to calculate µ' 1961 that is the estimated value of a round trip delay of the received signal. In this instance, if a plurality of primary sequence parts 1905 are used, a gain may be obtained by combining the signals of respective primary sequence parts. The method of estimating a round trip delay in units of symbols of a received signal, after obtaining µ' 1961 that is the estimated value of a round trip delay within a symbol of the received signal will be performed in a method similar to the method described with reference to FIG. 10.

Various embodiments that have been described with reference to drawings may be implemented independently from each other, or a plurality of embodiments may be implemented in combination when needed.

Figure 20:
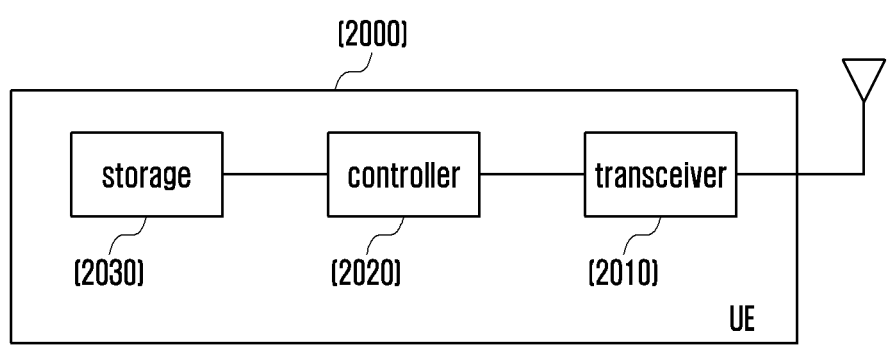
FIG. 20 is a diagram illustrating the structure of a UE according to an embodiment of the disclosure.

FIG. 20 is a diagram illustrating the structure of a user equipment (UE) according to an embodiment of the disclosure.

Referring to FIG. 20, a UE 2000 may include a transceiver 2010, a controller 2020, and a storage 2030. However, the elements of the UE 2000 are not limited to the above-described example, and for example, the UE 2000 may include more elements or fewer elements than the illustrated elements. In addition, the transceiver 2010, the storage 2030, the controller 2020, and the like may be embodied as a single chip.

The transceiver 2010 may perform signal transmission or reception with a base station 2140. Here, a signal may include control information and data. To this end, the transceiver 2010 may include an RF transmitter that up-converts and amplifies the frequency of a transmitted signal, an RF receiver that low-noise amplifies a received signal and down-converts the frequency of the signal, and the like. However, this is merely an example of the transceiver 2010, and the elements of the transceiver 2010 are not limited to an RF transmitter and an RF receiver. In addition, the transceiver 2010 may receive a signal via a wireless channel and may output the same to the controller 2020, and may transmit a signal output from the controller 2020 via a wireless channel. In addition, the transceiver 2010 may separately include an RF transceiver for a first wireless communication technology and an RF transceiver for a second wireless communication technology, or may perform, using a single transceiver, physical layer processing according to the first wireless communication technology and the second wireless communication technology.

The storage 2030 may store a program and data needed when the UE 2000 operates. In addition, the storage 2030 may store control information or data included in a signal that the UE 2000 transmits or receives. The storage 2030 may be embodied as a storage medium such as read only memory (ROM), random access memory (RAM), hard disk, compact disc (CD)-ROM, digital versatile disc (DVD), and the like, or a combination of storage media. In addition, a plurality of storages 2030 may be present.

The controller 2020 may control a series of processes so that the UE 2000 is capable of operating according to the above-described embodiments of the disclosure. For example, based on resource allocation information received via the transceiver 2010 from the base station 2140, the controller 2020 may perform data transmission or reception with a base station or another UE. A plurality of controllers 2020 may be present, and the controller 2020 may control the elements of the UE 2000 by implementing a program stored in the storage 2030. The controller 2020 may include at least one processor.

Figure 21:
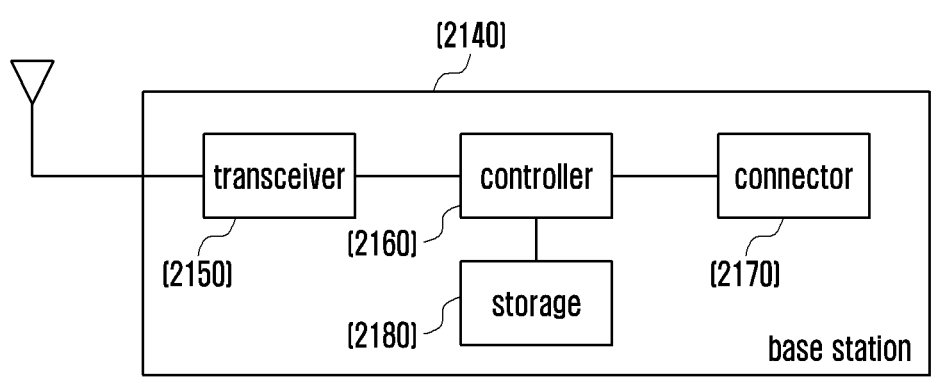
FIG. 21 is a diagram illustrating the structure of a base station according to an embodiment of the disclosure.

FIG. 21 is a diagram illustrating the structure of a base station according to an embodiment of the disclosure.

Referring to FIG. 21, a base station 2140 may include a transceiver 2150, a controller 2160, a connector 2170, and a storage 2180. However, the elements of the base station 2140 are not limited to the above-described example, and for example, the base station 2140 may include more elements or fewer elements than the illustrated elements. In addition, the transceiver 2150, the storage 2180, the controller 2160, and the like may be embodied as a single chip.

The transceiver 2150 may perform transmission or reception of a signal with a UE 2100. Here, a signal may include control information and data. To this end, the transceiver 2150 may include an RF transmitter that up-converts and amplifies the frequency of a transmitted signal, an RF receiver that low-noise amplifies a received signal and down-converts the frequency of the signal, and the like. This is merely an example of the transceiver 2150, and the elements of the transceiver 2150 are not limited to an RF transmitter and an RF receiver. In addition, the transceiver 2150 may receive a signal via a wireless channel and may output the same to the controller 2160, and may transmit a signal output from the controller 2160 via a wireless channel.

The controller 2160 may control a series of processes so that the base station 2140 is capable of operating according to the above-described embodiments of the disclosure. For example, the controller 2160 may produce a message to be transmitted to another base station, and may transmit the same to the other base station via the connector 2170. A plurality of controllers 2160 may be present, and the controller 2160 may control the elements of the base station 2140 by implementing a program stored in the storage 2180. In addition, the controller 2160 may include a DSM.

The storage 2180 may store a program and data needed when the base station operates. In addition, the storage 2180 may store control information or data included in a signal transmitted or received by the base station. The storage 2180 may be embodied as a storage medium such as ROM, RAM, hard disk, CD-ROM, DVD, and the like, or a combination of storage media. In addition, a plurality of storages 2180 may be present.

The connector 2170 may be a device that connects the base station 2140 to a core network and another base station, and may perform a physical layer processing for message transmission or reception and may perform transmission of a message to another base station and reception of a message from another base station.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE) in a communication system, the UE comprising:
   a transceiver; and
   a controller,
   wherein the controller is configured to:
      receive, from a base station, system information including information related to transmission of a random access preamble, and
      transmit, to the base station, a physical random access channel (PRACH) including the random access preamble,
   wherein the PRACH comprises at least one primary signal part including a first sequence for measuring a first delay within a symbol, and at least one secondary signal part including a second sequence for measuring a second delay in units of symbols, and
   wherein a round trip delay (RTD) between the UE and the base station is determined based on the first delay within the symbol and the second delay in units of symbols.

2. The UE of claim 1, wherein the first delay within the symbol is determined based on the first sequence of the at least one primary signal part received in a primary window.

3. The UE of claim 2, wherein the primary window is defined based on a maximum RTD of a cell and a length of a section including the first sequence included in the at least one primary signal part.

4. The UE of claim 1, wherein the second delay in units of symbols is determined based on the second sequence of the at least one secondary signal part received in a secondary window.

5. The UE of claim 4, wherein the secondary window is defined based on a primary window, the first delay within the symbol determined based on the primary window, and a length of a section including the second sequence included in the at least one secondary signal part.

6. The UE of claim 1,
   wherein each of the at least one secondary signal part comprises the second sequence repeated a different number of times, and
   wherein the second delay in units of symbols is determined based on whether the second sequence of each of the at least one secondary signal part is received in a secondary window.

7. The UE of claim 1,
   wherein each of the at least one secondary signal part comprises a plurality of different second sequences, and
   wherein the second delay in units of symbols is determined based on a combination of second sequences received respectively from the at least one secondary signal part in a secondary window.

8. The UE of claim 1,
   wherein the PRACH includes a plurality of primary signal parts, and
   wherein the first delay within the symbol is determined based on a combination of first sequences of the plurality of primary signal parts received in a primary window.

9. A base station of a communication system, the base station comprising:
   a transceiver; and
   a controller,
   wherein the controller is configured to:
      transmit, to a user equipment (UE), system information including information related to transmission of a random access preamble, and
      receive, from the UE, a physical random access channel (PRACH) including the random access preamble,
   wherein the PRACH comprises at least one primary signal part including a first sequence for measuring a first delay within a symbol and at least one secondary signal part including a second sequence for measuring a second delay in units of symbols, and
   wherein a round trip delay (RTD) between the UE and the base station is determined based on the first delay within the symbol and the second delay in units of symbols.

10. The base station of claim 9, wherein the first delay within the symbol is determined based on the first sequence of the at least one primary signal part received in a primary window.

11. The base station of claim 10, wherein the primary window is defined based on a maximum round trip delay of a cell and a length of a section including the first sequence included in the at least one primary signal part.

12. The base station of claim 9, wherein the second delay in units of symbols is determined based on the second sequence of the at least one secondary signal part received in a secondary window.

13. The base station of claim 12, wherein the secondary window is defined based on a primary window, the first delay within the symbol determined based on the primary window, and a length of a section including the second sequence included in the at least one secondary signal part.

14. The base station of claim 9,
wherein each of the at least one secondary signal part comprises the second sequence repeated a different number of times, and
wherein the second delay in units of symbols is determined based on whether the second sequence of each of the at least one secondary signal part is received in a secondary window.

15. The base station of claim 9,
wherein each of the at least one secondary signal part comprises a plurality of different second sequences, and
wherein the second delay in units of symbols is determined based on a combination of second sequences respectively received from the at least one secondary signal part in a secondary window.

16. The base station of claim 9,
wherein the PRACH comprises a plurality of primary signal parts, and
wherein the first delay within the symbol is determined based on a combination of first sequences of the plurality of primary signal parts received in a primary window.

17. A method of a user equipment (UE) in a communication system, the method comprising:
receiving, from a base station, system information including information related to transmission of a random access preamble; and
transmitting, to the base station, a physical random access channel (PRACH) including the random access preamble,
wherein the PRACH comprises at least one primary signal part including a first sequence for measuring a first delay within a symbol and at least one secondary signal part including a second sequence for measuring a second delay in units of symbols, and
wherein a round trip delay (RTD) between the UE and the base station is determined based on the first delay within the symbol and the second delay in units of symbols.

18. The method of claim 17,
wherein the first delay within the symbol is determined based on the first sequence of the at least one primary signal part received in a primary window defined based on a maximum RTD of a cell and a length of a section including the first sequence included in the at least one primary signal part, and
wherein the second delay in units of symbols is determined based on the second sequence of the at least one secondary signal part received in a secondary window defined based on the primary window, the first delay within the symbol determined based on the primary window, and a length of a section including the second sequence included in the at least one secondary signal part.

19. A method of a base station in a communication system, the method comprising:
transmitting, to a user equipment (UE), system information including information related to transmission of a random access preamble; and
receiving, from the UE, a physical random access channel (PRACH) including the random access preamble,
wherein the PRACH comprises at least one primary signal part including a first sequence for measuring a first delay within a symbol and at least one secondary signal part including a second sequence for measuring a second delay in units of symbols, and
wherein a round trip delay (RTD) between the UE and the base station is determined based on the first delay within the symbol and the second delay in units of symbols.

20. The method of claim 19,
wherein the first delay within the symbol is determined based on the first sequence of the at least one primary signal part received in a primary window defined based on a maximum RTD of a cell and a length of a section including the first sequence included in the at least one primary signal part, and
wherein the second delay in units of symbols is determined based on the second sequence of the at least one secondary signal part received in a secondary window defined based on the primary window, the first delay within the symbol determined based on the primary window, and a length of a section including the second sequence included in the at least one secondary signal part.

* * * * *